(12) United States Patent
Shay

(10) Patent No.: US 10,916,148 B2
(45) Date of Patent: *Feb. 9, 2021

(54) SYSTEM AND METHOD FOR OPTIMIZING AN AIRCRAFT TRAJECTORY

(71) Applicant: DOUBLE BLACK AVIATION TECHNOLOGY L.L.C., Lakewood, CO (US)

(72) Inventor: Richard Shay, Lakewood, CO (US)

(73) Assignee: Double Black Aviation Technology L.L.C., Lakewood, CO (US)

( * ) Notice: Subject to any disclaimer, the term of this patent is extended or adjusted under 35 U.S.C. 154(b) by 146 days.

This patent is subject to a terminal disclaimer.

(21) Appl. No.: 16/236,898

(22) Filed: Dec. 31, 2018

(65) Prior Publication Data

US 2019/0139424 A1 May 9, 2019

Related U.S. Application Data

(63) Continuation of application No. 15/670,152, filed on Aug. 7, 2017, now Pat. No. 10,170,008, which is a
(Continued)

(51) Int. Cl.
*G08G 5/00* (2006.01)
*G08G 5/04* (2006.01)
(Continued)

(52) U.S. Cl.
CPC .......... *G08G 5/0043* (2013.01); *G01C 21/20* (2013.01); *G01W 1/00* (2013.01); *G05D 1/0005* (2013.01);
(Continued)

(58) Field of Classification Search
CPC .. G08G 5/0043; G08G 5/0026; G08G 5/0082; G08G 5/02; G08G 5/04;
(Continued)

(56) References Cited

U.S. PATENT DOCUMENTS 5,797,106 A    8/1998   Murray et al.
6,177,888 B1   1/2001   Cabot et al.
(Continued)

OTHER PUBLICATIONS

Extended Search Report for European Patent Application No. 16178369.1, dated Dec. 15, 2016 12 pages.
(Continued)

*Primary Examiner* — Kelly D Williams
(74) *Attorney, Agent, or Firm* — Sheridan Ross P.C.

(57) ABSTRACT

Systems and methods of the present invention are provided to generate a plurality of flight trajectories that do not conflict with other aircraft in a local area. Interventions by an air traffic control system help prevent collisions between aircraft, but these interventions can also cause an aircraft to substantially deviate from the pilot's intended flight trajectory, which burns fuels, wastes time, etc. Systems and methods of the present invention can assign a standard avoidance interval to other aircraft in the area such that a pilot's aircraft does not receive an intervention by an air traffic control system. Systems and methods of the present invention also generate a plurality of conflict-free flight trajectories such that a pilot or an automated system may select the most desirable flight trajectory for fuel efficiency, speed, and other operational considerations, etc.

20 Claims, 20 Drawing Sheets

Related U.S. Application Data continuation of application No. 15/363,843, filed on Nov. 29, 2016, now Pat. No. 9,728,091, which is a continuation of application No. 14/949,529, filed on Nov. 23, 2015, now Pat. No. 9,536,435.

(60) Provisional application No. 62/191,573, filed on Jul. 13, 2015.

(51) Int. Cl.

| | | |
|---|---|---|
| G01C 21/20 | (2006.01) | |
| G05D 1/00 | (2006.01) | |
| G08G 5/02 | (2006.01) | |
| G05D 1/06 | (2006.01) | |
| G01W 1/00 | (2006.01) | |
| G05D 1/02 | (2020.01) | |

(52) U.S. Cl.
CPC ......... *G05D 1/0202* (2013.01); *G05D 1/0676* (2013.01); *G08G 5/0008* (2013.01); *G08G 5/0013* (2013.01); *G08G 5/0021* (2013.01); *G08G 5/0026* (2013.01); *G08G 5/0034* (2013.01); *G08G 5/0039* (2013.01); *G08G 5/0052* (2013.01); *G08G 5/0078* (2013.01); *G08G 5/0082* (2013.01); *G08G 5/0091* (2013.01); *G08G 5/02* (2013.01); *G08G 5/025* (2013.01); *G08G 5/04* (2013.01); *G08G 5/045* (2013.01)

(58) Field of Classification Search
CPC .. G08G 5/0013; G08G 5/0021; G08G 5/0034; G08G 5/0039; G08G 5/0052; G08G 5/0078; G08G 5/0091; G08G 5/025; G08G 5/045; G08G 5/0008; G05D 1/0676; G05D 1/0005; G05D 1/0202; G01C 21/20; G01W 1/00
See application file for complete search history.

(56) References Cited

U.S. PATENT DOCUMENTS

| | | | |
|---|---|---|---|
| 6,393,358 | B1 | 5/2002 | Erzberger et al. |
| 6,438,492 | B1 | 8/2002 | Le Tallec et al. |
| 6,505,102 | B2 | 1/2003 | Morizet et al. |
| 7,165,747 | B2 | 1/2007 | Artini et al. |
| 7,177,731 | B2 | 2/2007 | Sandell et al. |
| 7,188,007 | B2 | 3/2007 | Boorman et al. |
| 7,203,577 | B2 | 4/2007 | Gunn et al. |
| 7,256,710 | B2 | 8/2007 | Mumaw et al. |
| 7,262,730 | B2 | 8/2007 | Larsson et al. |
| 7,269,486 | B2 | 9/2007 | Artini |
| 7,321,813 | B2 | 1/2008 | Meunier |
| 7,330,781 | B2 | 2/2008 | Artini et al. |
| 7,363,119 | B2 | 4/2008 | Griffin, III et al. |
| 7,385,527 | B1 | 6/2008 | Clavier |
| 7,400,951 | B2 | 7/2008 | Artini et al. |
| 7,428,451 | B2 | 9/2008 | Artini et al. |
| 7,512,464 | B2 | 3/2009 | Tarleton et al. |
| 7,636,619 | B2 | 12/2009 | Winkler et al. |
| 7,636,635 | B2 | 12/2009 | Winkler et al. |
| 7,751,947 | B2 | 7/2010 | Gunn et al. |
| 7,751,948 | B2 | 7/2010 | Boorman et al. |
| 7,826,971 | B2 | 11/2010 | Fontaine et al. |
| 7,834,301 | B2 | 11/2010 | Clingman |
| 7,853,368 | B2 | 12/2010 | Artini |
| 7,877,197 | B2 | 1/2011 | Lewis et al. |
| 7,899,613 | B2 | 3/2011 | Artini |
| 7,945,354 | B2 | 5/2011 | Boorman et al. |
| 7,970,502 | B2 | 6/2011 | Boorman et al. |
| 8,005,582 | B2 | 8/2011 | Boorman et al. |
| 8,010,288 | B2 | 8/2011 | Bouchet et al. |
| 8,032,266 | B2 | 10/2011 | Bitar et al. |
| 8,073,579 | B2 | 12/2011 | Marty et al. |
| 8,082,070 | B2 | 12/2011 | Gunn et al. |
| 8,121,745 | B2 | 2/2012 | Boorman et al. |
| 8,135,501 | B2 | 3/2012 | Boorman et al. |
| 8,155,866 | B2 | 4/2012 | Berard et al. |
| 8,165,734 | B2 | 4/2012 | Wachenheim et al. |
| 8,165,790 | B2 | 4/2012 | Bailey |
| 8,209,115 | B2 | 6/2012 | Lucas et al. |
| 8,271,186 | B2 | 9/2012 | Nouvel et al. |
| 8,364,329 | B2 | 1/2013 | Boorman et al. |
| 8,380,424 | B2 | 2/2013 | Bushnell |
| 8,494,761 | B2 | 7/2013 | Giovannini et al. |
| 8,600,675 | B1 | 12/2013 | Borghese et al. |
| 8,606,491 | B2 | 12/2013 | Subbu et al. |
| 8,639,401 | B2 | 1/2014 | Bailey et al. |
| 8,731,812 | B2 | 5/2014 | Bushnell |
| 8,751,070 | B2 | 6/2014 | Silly et al. |
| 8,781,654 | B2 | 7/2014 | Giovannini et al. |
| 8,788,188 | B1 | 7/2014 | Bailey |
| 8,798,812 | B2 | 8/2014 | Ryu et al. |
| 8,825,366 | B2 | 9/2014 | Giovannini et al. |
| 8,867,025 | B1 | 10/2014 | Smalls |
| 8,892,349 | B2 | 11/2014 | Estkowski et al. |
| 8,897,934 | B2 | 11/2014 | Meunier et al. |
| 8,897,935 | B2 | 11/2014 | Meunier et al. |
| 8,942,914 | B2 | 1/2015 | Subbu et al. |
| 9,008,867 | B2 | 4/2015 | Potagnik et al. |
| 9,098,997 | B2 | 8/2015 | Stewart et al. |
| 9,536,435 | B1 | 1/2017 | Shay |
| 9,728,091 | B2 | 8/2017 | Shay |
| 1,017,000 | A1 | 1/2019 | Shay |
| 2005/0035898 | A1 | 2/2005 | Shiomi et al. |
| 2005/0270224 | A1 | 12/2005 | Silberman et al. |
| 2005/0273223 | A1 | 12/2005 | Artini et al. |
| 2006/0005147 | A1 | 1/2006 | Hammack et al. |
| 2006/0052912 | A1 | 3/2006 | Meunier |
| 2006/0256000 | A1 | 11/2006 | Larsson et al. |
| 2007/0050101 | A1 | 3/2007 | Sacle et al. |
| 2007/0135989 | A1 | 6/2007 | Hengst |
| 2007/0276553 | A1 | 11/2007 | Bitar et al. |
| 2008/0177431 | A1 | 7/2008 | Coulmeau et al. |
| 2008/0195301 | A1 | 8/2008 | Fabre et al. |
| 2008/0288164 | A1 | 11/2008 | Lewis et al. |
| 2009/0076728 | A1 | 3/2009 | Bouchet et al. |
| 2009/0088972 | A1 | 4/2009 | Bushnell |
| 2009/0125236 | A1 | 5/2009 | Fontaine et al. |
| 2009/0157241 | A1 | 6/2009 | Meunier et al. |
| 2009/0319100 | A1 | 12/2009 | Kale |
| 2009/0326741 | A1 | 12/2009 | Marty et al. |
| 2010/0060511 | A1 | 3/2010 | Nouvel et al. |
| 2010/0121503 | A1 | 5/2010 | Sundqvist |
| 2010/0318295 | A1 | 12/2010 | Flotte et al. |
| 2012/0143505 | A1 | 6/2012 | Giovannini et al. |
| 2012/0158219 | A1 | 6/2012 | Durling et al. |
| 2012/0179368 | A1 | 7/2012 | Walter |
| 2012/0209457 | A1 | 8/2012 | Bushnell |
| 2013/0080043 | A1* | 3/2013 | Ballin .................. G08G 5/0078 701/120 |
| 2013/0090787 | A1 | 4/2013 | Ryu et al. |
| 2013/0096818 | A1 | 4/2013 | Vicharelli et al. |
| 2013/0321177 | A1 | 12/2013 | Kirk |
| 2013/0332059 | A1 | 12/2013 | del Poza de Poza |
| 2014/0019034 | A1 | 1/2014 | Bushnell |
| 2014/0081567 | A1 | 3/2014 | Kirk et al. |
| 2014/0107913 | A1 | 4/2014 | Vicharelli et al. |
| 2014/0142838 | A1 | 5/2014 | Durand |
| 2014/0309916 | A1 | 10/2014 | Bushnell |
| 2015/0134150 | A1 | 5/2015 | Farjon |

OTHER PUBLICATIONS

Official Action for U.S. Appl. No. 14/949,529, dated Mar. 11, 2016, 22 pages.

Notice of Allowance for U.S. Appl. No. 14/949,529, dated Aug. 24, 2016, 16 pages.

Official Action for U.S. Appl. No. 15/363,843, dated Dec. 23, 2016 8 pages.

(56) References Cited

OTHER PUBLICATIONS

Notice of Allowance for U.S. Appl. No. 15/363,843, dated Apr. 7, 2017 5 pages.
Official Action for U.S. Appl. No. 15/670,152, dated Apr. 19, 2018, 7 pages.
Notice of Allowance for U.S. Appl. No. 15/670,152, dated Aug. 23, 2018, 7 pages.

* cited by examiner

SYSTEM AND METHOD FOR OPTIMIZING AN AIRCRAFT TRAJECTORY

CROSS REFERENCE TO RELATED APPLICATIONS

This application is a Continuation of U.S. application Ser. No. 15/670,152 filed Aug. 7, 2017, which is a Continuation of U.S. application Ser. No. 15/363,843 filed Nov. 29, 2016, which is a Continuation of U.S. application Ser. No. 14/949,529 filed Nov. 23, 2015, which claims priority to U.S. Provisional Patent Application Ser. No. 62/191,573 filed Jul. 13, 2015, the disclosures of which are incorporated herein in their entireties by reference.

FIELD OF THE INVENTION

The present invention relates to the systems and methods for generating flight trajectories for aircraft in flight to meet operational requirements, minimize fuel burn, reduce off path vectoring, and minimize the number of level flight segments during climbs and descents.

BACKGROUND OF THE INVENTION

The Federal Aviation Administration (FAA) and other Air Navigation Service Providers (ANSPs) around the world maintain air traffic control systems (ATCs) to organize the flow of aircraft traffic in a particular airspace and to avoid conflicts and prevent collisions among airborne aircraft. To accomplish this task, ATCs rely on ground-based radar systems to determine the "state vector" of an aircraft which includes altitude, position, East-West velocity, North-South velocity, and vertical rate. Currently, ATCs use these state vectors to coordinate the flow of aircraft traffic, and ATCs maintain spacing between aircraft by dictating instructions to individual aircraft. However, individual aircraft do not receive the radar based state vector of other aircraft in the area, and aircraft rely on ATC to provide instructions that avoid conflicts and possible collisions with other aircraft.

ATCs are required to intervene and assign an aircraft a different speed, a level segment, or an off course vector if two aircraft are on flight paths that conflict. In some cases, ATCs will assign all three to maintain proper separation between aircraft. These interventions also add workload for the ATCs, increase fuel burn, cause excess carbon dioxide and nitric oxide emissions, and can increase noise levels experienced by the surrounding community.

In addition, pilots plan a phase of flight trajectories without knowledge of other aircraft in the area, and interventions by ATCs disrupt these plans. For example, when planning the descent phase of the flight, the pilot selects the desired descent speeds and determines the Top of Descent (TOD), which is the aircraft's transition between the en route phase and the descent phase of the flight. The pilot selects the desired descent speeds based on operational requirements such as maximizing fuel efficiency, improving the arrival time of the aircraft, or other parameters, such as turbulence avoidance, that characterize the flight trajectory. These operational requirements may be derived from a pilot flying the aircraft or the Airline Operations Control (AOC) that coordinates aircraft for an airline company. The operational limits used in determining the descent speeds can be set by the manufacturer, the aircraft operator, and the government regulators that oversee the operation of aircraft. On aircraft equipped with a Flight Management System (FMS) which automates certain in-flight tasks, the operational requirement may be set within the FMS to reduce cost or improve fuel efficiency. Prior to the TOD the pilot selects the appropriate speed profile within the FMS to plan a descent phase for the aircraft that, for example, minimizes fuel burn. In other instances, the operational requirement may be to fly faster and arrive at an airport to meet a scheduled arrival time. These operational requirements are inhibited and sometimes vitiated when an ATC intervenes during an aircraft's decent phase.

To supplement state vector information from ground-based radar systems, the aviation industry is developing and deploying the Automatic Dependent Surveillance-Broadcast (ADS-B) system, which requires an aircraft to broadcast state vector information determined by the aircraft's onboard sensors. The FFA defines the capabilities of ADS-B under the DO-260B standard. This change enables other aircraft in the area to receive the broadcasted ADS-B data and the state vector of other proximate aircraft. Now, aircraft are able to receive state vector information directly from other aircraft instead of solely relying on the ATC to provide instructions and avoid conflicts and possible collisions with other aircraft.

Even with knowledge of aircraft in the area, current trajectory generating devices are inflexible. These devices provide a pilot with either a single proposed trajectory that identifies the trajectory of minimum fuel burned or a single proposed trajectory that identifies the least amount of time required to fly the proposed trajectory. These trajectory solutions are limited to cruise flight that are accomplished by adjusting the speed, the vertical and/or the horizontal paths of the trajectory. When the devices provide single, automated solutions in this fashion, they remove the pilot and other entities from the decision making process and do not allow for more comprehensive, efficient solutions to be identified. While pilots can plan flight trajectories that best suit one operational requirement, pilots still rely on ATCs to ensure safe separation between aircraft.

In addition, pilots lack state vector information of surrounding aircraft, but pilots may also lack additional information including up-to-date wind information, special use airspace, turbulence information, volcanic ash reports, ANSP sector boundaries, letters of agreement between ANSP sectors, ATC sector loading, country over flight costs, temperature inversion layers, sonic boom regulations, the transport of wake vortices and sonic booms. Therefore, there is a need for a system and a method that generates a plurality of flight trajectories that synthesizes information from multiple sources and prevents or minimizes interventions by ATCs, which undermine the operational requirements associated with the aircraft.

SUMMARY OF THE INVENTION

In accordance with the invention, systems and methods are provided for generating a plurality of conflict-free flight trajectories that best suits one or more selected operational requirements of a pilot, an AOC, an ATC, etc. The plurality of conflict-free flight trajectories provide more than separation assurance from other aircraft. The plurality of flight trajectories is free of conflicts such as other aircraft, weather events, no-fly zones, and other restrictions. In addition, the conflict-free flight trajectories are vetted or calculated based on one or more parameters. For example, flight trajectories may be generated based on fuel efficiency, time efficiency, optimum airspeed, and combinations of the same. The resulting plurality of conflict-free flight trajectories saves fuel and time, offers flexibility to pilots and airlines, reduces the workload of ATCs, reduces fuel burn, reduces noise, reduces the emission of carbon dioxide, and reduces nitric oxide by requiring fewer interventions.

The system for generating a plurality of conflict-free flight trajectories may generate a first set of flight trajectories based on a first parameter and a second set of flight trajectories based on a second parameter. For example, the first set of flight trajectories may be generated by first calculating the most fuel efficient flight trajectory, i.e., the flight trajectory that burns the least amount of fuel. For the next iteration, the first solution is suppressed, and the second-most fuel efficient flight trajectory is calculated. This iterative process continues until a flight trajectory is calculated that consumes the maximum incremental amount of fuel allowable, which may be established by a pilot, an airline, a government regulation, etc. A similar iterative process generates a second set of flight trajectories based on time. A subsequent post-processing method may be applied to the two sets of flight trajectories, including various set operations that construct new sets of flight trajectories from the two sets of flight trajectories. These set operations include "union," which adds the contents of both sets, or in other words, the union of two sets is the set of all flight trajectories in both sets. The set operation of "intersection" creates a new set with only the flight trajectories that are present in both the first set and the second set. In the set operation of "set difference," a new set is created that has all of the flight trajectories in the first set that are not present in the second set. With the set operation of "symmetric difference," a new set of flight trajectories is created that has all of the flight trajectories in the first set that are not present in the second set, all of the flight trajectories in the second set that are not present in the first set, but none of the flight trajectories that are in both the first set and the second set. It will be appreciated that these embodiments may include other set operations and/or additional sets of flight trajectories based on additional parameters. Once the post-processing is complete, the resulting set of flight trajectories may be presented to a pilot so that the pilot may select a flight trajectory or input into an algorithm that automatically selects a flight trajectory. In some embodiments, once the flight trajectory is selected a new TOD is generated and entered into the FMS.

In another aspect of the invention, a standard avoidance interval (SAI) is assigned to proximate aircraft to prevent interventions by ATCs. A SAI is an enclosed volume, or partially enclosed volume, that the instant aircraft assigns to other aircraft in the area. The SAI functions as a spatial buffer between the instant aircraft and the other aircraft in the area. For example, if the instant aircraft determines a flight trajectory that passes within the SAI assigned to another aircraft, then there is a conflict because the instant aircraft is passing too close to the other aircraft. In the United States, FAA guidelines dictate when two aircraft are too close together and when an ATC intervenes to change the spacing between two aircraft. Therefore, the instant aircraft assigns a SAI to other aircraft that is larger, or more conservative, than FAA guidelines. By not conflicting with the assigned SAI, the instant aircraft comports with FAA guidelines and avoids interventions by ATCs.

In an exemplary embodiment, the enclosed volume of the SAI has a cylinder shape defined by a vertical separation distance extending above and below the aircraft and defined by a constant horizontal radius extending from a vertical axis of the aircraft. The size and shape of the SAI assigned to a local aircraft may depend on the speed, performance, size, configuration and type of aircraft, the proximity to an ATC boundary or airport, the point in the flight trajectory, etc. Further, different entities may use their own SAI standards. For example, SAI standards may be established by an airline, an aircraft operator, an airport, a Metroplex of airports, an airspace sector, a national airspace system or an international standard defined by the International Civil Aviation Organization (ICAO). It will be appreciated that in some embodiments of the present invention, a SAI may be assigned to another aircraft that dictates the maximum distance between two aircraft instead of how close two aircraft may be separated. Thus, an aircraft may have more than one SAI.

Once a SAI has been assigned to a local aircraft, a miss distance can be calculated and compared to the SAI to determine if there is a conflict, i.e., a potential collision or close call. The miss distance is the closest distance that two aircraft will pass relative to each other, and in some embodiments, the miss distance is a vector with directional information. The miss distance is calculated based on the state vector information of both aircraft. While information such as position, speed, direction, and vertical climb/descent rate are useful when calculating a miss distance, these parameters may not prove useful in specific instances, for example, when a local aircraft makes a banking turn or otherwise changes its path. Therefore, it is contemplated in some embodiments, that a rate change or acceleration of the bearing or one or both of the relevant aircraft may be utilized to provide a more accurate determination of a miss distance. Further, information such as a meter fix or a way point, which are reference points in space that an aircraft passes through, and a destination may be accounted for when determining a miss distance. The miss distance is then compared to the SAI of the local aircraft. If the miss distance places the instant aircraft within the SAI of the local aircraft, then there is a conflict, and the proposed flight trajectory is not conflict free. Once the SAI and the miss distance determine which flight trajectories are conflict free, a FMS may update the TOD for a descent phase of the flight.

A flight trajectory may pass through a traffic avoidance waypoint (TAW) to avoid a conflict with a local aircraft. In one example, an instant aircraft has established a flight trajectory between a TOD and a waypoint close to an airport, but the SAI of a local aircraft and the miss distance between the two aircraft causes a conflict. Several TAWs are provided that have a sufficiently large miss distance and are conflict free. The pilot of the instant aircraft may then select a TAW for the aircraft to travel through that best suits the relevant operational requirements, and a new flight trajectory and a new TOD may be subsequently determined. The new flight trajectory may be curved and may pass through the selected TAW point in some embodiments. In an exemplary embodiment, a brachistochronic flight trajectory, which is the trajectory of fastest descent between the TOD and the end of the chosen descent segment, is chosen to pass through the selected TAW point. Alternatively, in other embodiments, the flight path is discretized into segments with separate constant speed profiles, and the selected TAW serves as a transition point between segments.

It will be appreciated that the plurality of TAWs may be one dimensional, two dimensional, or three dimensional. In the one dimensional embodiment, the TAWs are located at various altitudes over a reference point on the ground path, and thus the TAWs form a vertical path along the instant aircraft's flight plan path. In an exemplary two dimensional embodiment, multiple TAWs may form a two dimensional area, and the multiple TAWs are positioned over different locations along the ground path. Lastly, in the three dimensional embodiment, multiple TAWs may form a three dimensional body, and some TAWs may not be positioned over the flight plan ground path.

In further embodiments, the TAWs are limited, for example, in view of a conflict like a local aircraft that is too close to an instant aircraft. In some embodiments, an upper altitude limit, a lower altitude limit, an upper speed limit, and/or a lower speed limit govern which TAWs are conflict free. Once a TAW is selected, a new flight trajectory is calculated.

Embodiments of the present invention may generate other waypoints that, either alone or in combination with the TAWs, allow a flight trajectory to be optimized for other factors. For example, a flight trajectory may pass through an energy management waypoint (EMW) to achieve a desired total energy state at a desired location over the ground. In one embodiment, an instant aircraft has established a conflict free flight trajectory comprised of several TAWs that have a sufficiently large miss distance between the TOD and the desired landing runway. By selecting a landing function an additional EMW is inserted into the trajectory to ensure that the aircraft's total energy state is compatible with making a safe final approach and landing on the desired runway. The landing function may generate EMWs in addition to the conflict free TAWs, in which case the flight trajectory passes through the selected TAW and the selected EMW. In some embodiments, one or more EMWs are selected from the conflict free TAWs, and the selected TAW and the selected EMW may constitute the same waypoint. Further still, a plurality of TAWs and a plurality of EMWs are generated where the two sets of waypoints partially overlap.

Another example of an EMW is when the pilot wishes to avoid spending time at an altitude (or range of altitudes) where aircraft structural icing occurs. By inserting EMWs into the trajectory the instant aircraft could avoid spending time at altitudes where icing conditions exist. In yet another example the aircraft's total energy could be managed to avoid possible injury to passengers and crew by being within the optimum speed for penetration of turbulent airspace. By inserting EMWs into the trajectory the instant aircraft can travel at the proper speed for turbulent conditions and avoid excessively violent gyrations associated with flying too fast in turbulent air.

It will be appreciated that EMWs can be used when there is no traffic and that EMWs could also be generated and selected in combination with a TAW when traffic is present. It will further be appreciated that when EMWs are inserted into the planned trajectory prior to the TOD the FMS can then optimize the entire trajectory of standard waypoints, TAWs and EMWs.

Considering the above described features and attributes, in one aspect of the invention, it can be considered a method for automatically determining a plurality of conflict-free flight trajectories for a first aircraft, comprising: (i) providing at least one electronic device to process instructions for determining a plurality of flight trajectories; (ii) providing information regarding a first aircraft moving in space according to a state vector; (iii) providing information regarding a second aircraft moving in space according to a state vector, the second aircraft having a standard avoidance interval extending in at least one direction from the second aircraft; (iv) determining, by the at least one electronic device, a first flight trajectory for the first aircraft based on the state vector of the first aircraft, the first flight trajectory being optimized for a first parameter; (v) comparing, by the at least one electronic device, the first flight trajectory to the state vector of the second aircraft to determine a miss distance between the first aircraft and the second aircraft; (vi) comparing, by the at least one electronic device, the miss distance to the standard avoidance interval of the second aircraft to confirm that the miss distance is greater than the standard avoidance interval; (vii) determining, by the at least one electronic device, a second flight trajectory for the first aircraft based on the state vector of the first aircraft, the second flight trajectory being distinct from the first flight trajectory; and (viii) sending instructions to the first aircraft indicating the first and second flight trajectories, and wherein the first aircraft travels on a flight trajectory from one of the first and second flight trajectories.

In various aspects of the invention, it may be considered a method, further comprising comparing, by the at least one electronic device, the second flight trajectory to the state vector of the second aircraft to determine a second miss distance between the first aircraft and the second aircraft; and comparing, by the at least one electronic device, the second miss distance to the standard avoidance interval of the second aircraft to confirm that the second miss distance is greater than the standard avoidance interval. The first flight trajectory may be optimized for fuel or time efficiency, wherein a plurality of flight trajectories range between the first flight trajectory and a flight trajectory that uses the maximum incremental fuel or time allowance.

In another aspect of the invention, it can be considered a method for automatically determining a plurality of traffic avoidance waypoints for conflict-free flight trajectories for a first aircraft, comprising: (i) providing at least one electronic device to process instructions for determining a plurality of traffic avoidance waypoints; (ii) providing information regarding a first aircraft moving in space according to a state vector; (iii) providing information regarding a second aircraft moving in space according to a state vector, the second aircraft having a standard avoidance interval extending in at least one direction from the second aircraft; (iv) determining, by the at least one electronic device, a first flight trajectory for the first aircraft based on the state vector of the first aircraft, the first flight trajectory having a ground path; (v) comparing, by the at least one electronic device, the first flight trajectory to the state vector of the second aircraft to determine a miss distance between the first aircraft and the second aircraft when the first aircraft is located at a miss point on the first flight trajectory, wherein the standard avoidance interval of the second aircraft is greater than the miss distance, and wherein a reference point is located on the ground path of the first flight trajectory below the miss point; (vi) determining, by the at least one electronic device, a plurality of traffic avoidance waypoints at various altitudes above the reference point, wherein each traffic avoidance waypoint has a miss distance relative to the state vector of the second aircraft that is larger than the standard avoidance interval of the second aircraft; and (vii) selecting a traffic avoidance waypoint from the plurality of traffic avoidance waypoints based on at least one parameter, and wherein the first aircraft travels through the selected traffic avoidance waypoint.

In some aspects, it can be considered a system further comprising (viii) providing information regarding an icing event having a volume; (ix) determining, by the at least one electronic device, a plurality of energy management waypoints at various altitudes above the ground path of the first flight trajectory, wherein the plurality of energy management waypoints avoid the volume of the icing event; and (x) selecting an energy management waypoint from the plurality energy management waypoints, wherein the first aircraft travels through the selected energy management waypoint. In some embodiments, at least a portion of the volume of the icing event has a temperature between −5° C. and 2° C. In various embodiments, the plurality of energy management waypoints at least partially overlaps with the plurality of traffic avoidance waypoints.

In further aspects, it can be considered a system further comprising (viii) providing information regarding a turbulence event having a volume; (ix) determining, by the at least one electronic device, a plurality of energy management waypoints at various altitudes above the ground path of the first flight trajectory, wherein the plurality of energy management waypoints avoid the volume of the turbulence event; and (x) selecting an energy management waypoint from the plurality energy management waypoints, wherein the first aircraft travels through the selected energy management waypoint. In some embodiments, at least a portion of the turbulence event has a Reynolds Number greater than 5000.

In another aspect of the invention, it can be considered a system for automatically determining a plurality of conflict-free trajectories for a first aircraft, comprising: (i) a local data device that determines a state vector for a first aircraft, the local data device sends the state vector for the first aircraft to a trajectory generation device; (ii) a transmitted data device that determines a state vector for a second aircraft, the transmitted data device sends the state vector for the second aircraft to the trajectory generation device; (iii) the trajectory generation device assigns a standard avoidance interval to the second aircraft, the standard avoidance interval extends in at least one direction from the second aircraft, the trajectory generation device determines a plurality of flight trajectories based on the state vector of the first aircraft, the trajectory generation device compares each flight trajectory to the state vector of the second aircraft to determine a plurality of miss distances, the trajectory generation device confirms that each miss distance is greater than the standard avoidance interval for the second aircraft; and (iv) a flight management system receives a conflict-free flight trajectory from the plurality of conflict-free flight trajectories, wherein the flight management system executes the received conflict-free flight trajectory, and the first aircraft travels on the received conflict-free flight trajectory.

In various aspects, it can be considered a system further comprising a display unit operably interconnected to the trajectory generation device, the display unit displays the plurality of conflict-free flight trajectories; and an input user interface operably interconnected to the display unit and the flight management system, the input user interface configured to receive at least one input in response to the plurality of conflict-free flight trajectories being displayed on the display unit, the input user interface sends a selected conflict-free flight trajectory to the flight management system. The at least one received input is one of a physical input from a pilot, and an automated input from a system based on at least one parameter. In some aspects, it can be considered a system further comprising an onboard traffic device that is operably interconnected to the transmitted data device and the trajectory generation device; and an internet-based data device that determines another state vector for the second aircraft, wherein the onboard traffic device synthesizes the state vector for the second aircraft from both the transmitted data device and the internet-based data device, and sends the synthesized state vector for the second aircraft to the trajectory generation device. In another aspect, it may be considered a system further comprising an air data device that generates at least one of airspeed data and atmospheric data surrounding the first aircraft, and the air data device sends the data to the trajectory generation device.

In another aspect of the invention, it can be considered a system for automatically determining a plurality of conflict-free trajectories for a first aircraft, comprising: (i) a local data device that determines a state vector for a first aircraft, the local data device sends the state vector for the first aircraft to a trajectory generation device; (ii) a transmitted data device that receives a known flight trajectory of a second aircraft, the transmitted data device sends the known flight trajectory of the second aircraft to the trajectory generation device; (iii) the trajectory generation device assigns a standard avoidance interval to the second aircraft, the standard avoidance interval extends in at least one direction from every point along the known flight trajectory of the second aircraft, the trajectory generation device determines a plurality of flight trajectories based on the trajectory of the first aircraft, the trajectory generation device compares each flight trajectory to the known flight trajectory of the second aircraft to determine a plurality of miss distances, the trajectory generation device confirms that each miss distance is greater than the standard avoidance interval for the second aircraft; and (iv) a flight management system receives a conflict-free flight trajectory from the plurality of conflict-free flight trajectories, wherein the flight management system executes the received conflict-free flight trajectory, and the first aircraft travels on the received conflict-free flight trajectory.

In yet another aspect of the invention, it can be considered a method for automatically determining a plurality of conflict-free flight trajectories for a first aircraft, comprising: (i) providing at least one electronic device to process instructions for determining a plurality of flight trajectories; (ii) providing information regarding a first aircraft moving in space according to a state vector; (iii) providing information regarding a second aircraft moving in space according to a state vector, the second aircraft having a standard avoidance interval extending in at least one direction from the second aircraft; (iv) determining, by the at least one electronic device, a plurality of first flight trajectories for the first aircraft based on the state vector of the first aircraft, the plurality of first flight trajectories being optimized for a first parameter; (v) comparing, by the at least one electronic device, a plurality of miss distances between the plurality of first flight trajectories and the state vector of the second aircraft to the standard avoidance interval of the second aircraft to confirm that the plurality of miss distances is greater than the standard avoidance interval; (vi) determining, by the at least one electronic device, a plurality of second flight trajectories for the first aircraft based on the state vector of the first aircraft, the plurality of second flight trajectories being optimized for a second parameter; (vii) comparing, by the at least one electronic device, a plurality of miss distances between the plurality of second flight trajectories and the state vector of the second aircraft to the standard avoidance interval of the second aircraft to confirm that the plurality of miss distances is greater than the standard avoidance interval of the second aircraft; and (viii) combining, by the at least one electronic device, the plurality of first flight trajectories with the plurality of the second flight trajectories to form a plurality of conflict-free flight trajectories. In some aspects, it may be considered combining of the plurality of first flight trajectories with the plurality of the second flight trajectories is performed by at least one of a union operation, an intersection operation, a set difference operation, and a symmetric difference operation.

In yet another aspect of the invention, it can be considered that the a method for automatically determining a plurality of conflict-free flight trajectories can reside on the ground or in another aircraft and then transmitted to the aircraft that will use the plurality of conflict-free flight trajectories to avoid ATC intervention.

Further advantages and features of the invention will become apparent from a review of the following detailed description, taken in conjunction with the drawings.

BRIEF DESCRIPTION OF THE DRAWINGS

Reference is now made to the following detailed description taken in conjunction with the accompanying drawings in order for a more thorough understanding of the invention.

DETAILED DESCRIPTION

Figure 1:
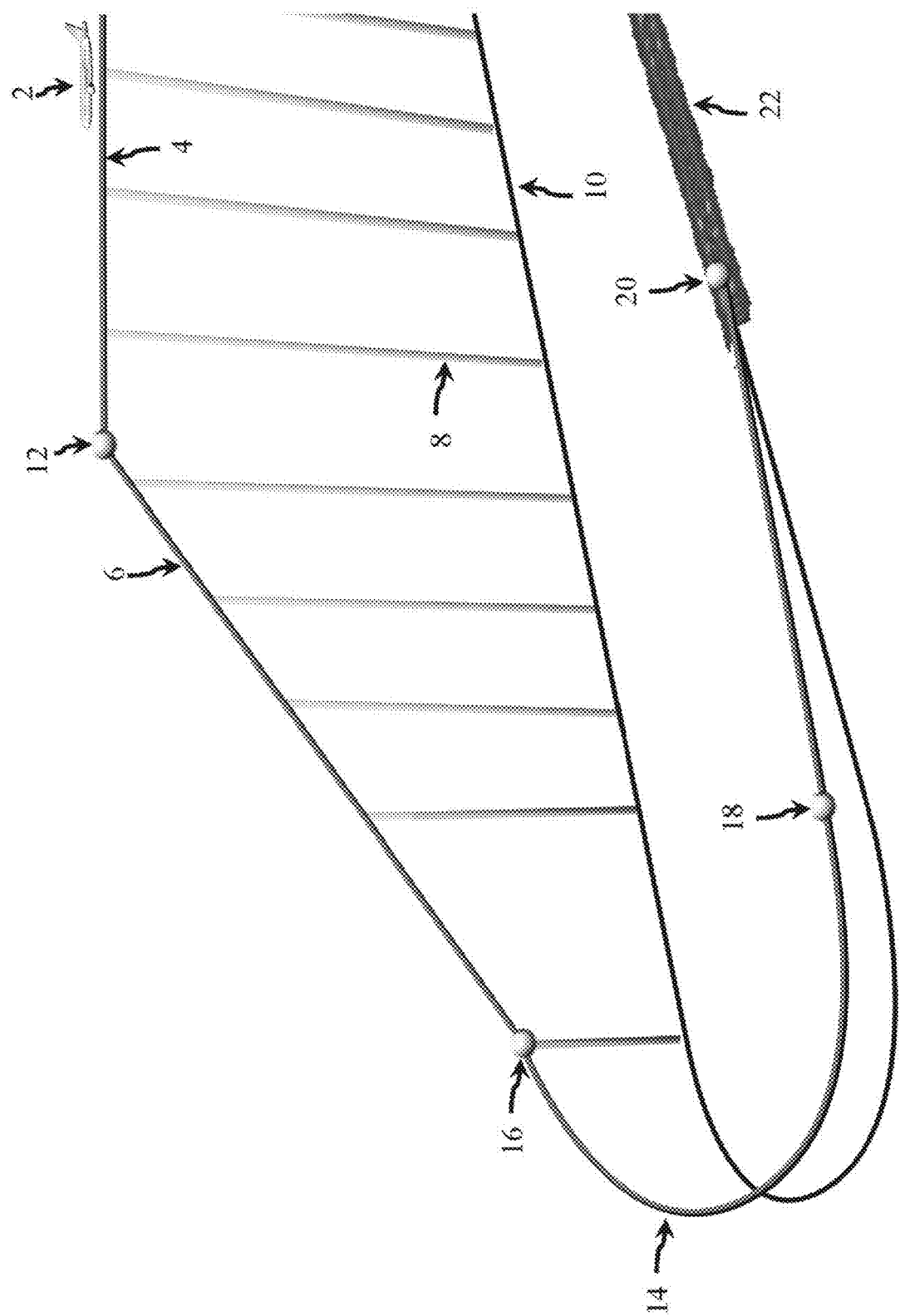
FIG. 1 illustrates a prior art system where an aircraft is entering a descent phase of a flight trajectory and there are no other aircraft in the area.
Figure 2:
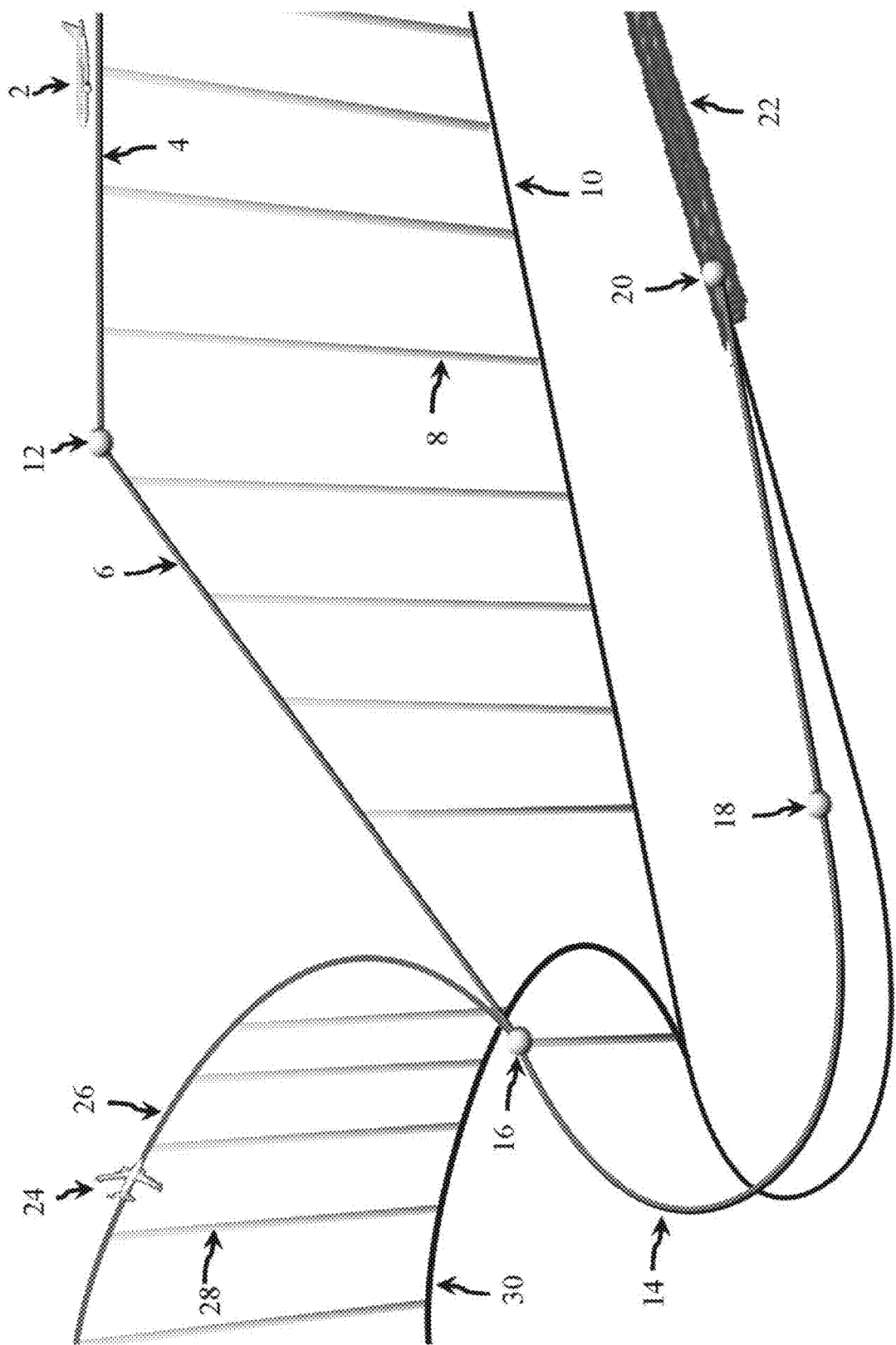
FIG. 2 illustrates a prior art system where an aircraft is entering a descent phase of a flight trajectory toward a merge point where a second aircraft is also traveling toward the merge point.
Figure 3:
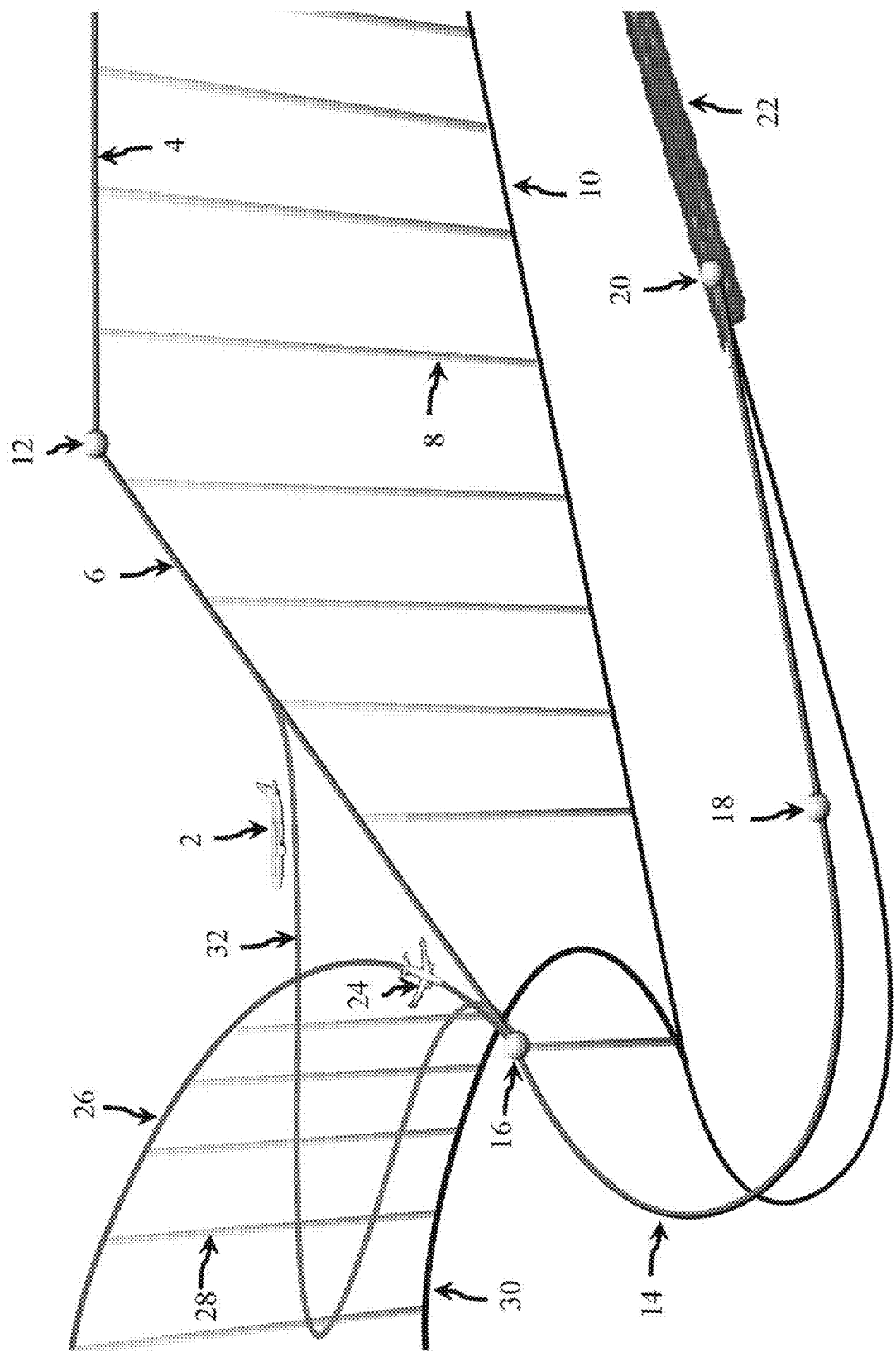
FIG. 3 illustrates a prior art system where an aircraft entering a descent phase of a flight trajectory has deviated course on a long vector to avoid encroaching on a second aircraft.

Referring to FIGS. 1-3, several prior art scenarios are provided to highlight the shortcomings of existing aviation systems that will often require an air traffic control (ATC) system to intervene and instruct a pilot to change the aircraft's flight trajectory. FIG. 1 shows an aircraft 2 that is leaving an en route phase 4 of the aircraft's flight trajectory and entering a descent phase 6. In this scenario, there are no other aircraft in the immediate area. During the aircraft's en route phase 4, the aircraft 2 is flying at a generally constant altitude. Flight path shadow lines or altitude bars 8 are provided to show the relative altitude of the aircraft's flight trajectory at periodic intervals. The lower ends of the altitude bars 8 create a ground path 10 of the flight path that shows where the aircraft 2 is flying above the ground.

The transition between the en route phase 4 of the aircraft's flight trajectory and the descent phase 6 is called the Top of Descent (TOD) 12. The TOD 12 is an important aspect of the aircraft's 2 overall flight trajectory because this is the point where an onboard Flight Management System (FMS) or pilot can plan the descent phase 6 to be as efficient as possible with respect to fuel, other costs, time, range, etc., or any combination thereof. For example, the FMS may set a TOD 12 such that the aircraft 2 glides as long as possible with the engines at idle power to conserve the maximum amount of fuel.

At the end of the decent phase 6, the aircraft 2 enters a low altitude flight phase 14, which may be defined by the airport and its ATC systems by a series of waypoints that the aircraft must pass through as the aircraft lands at the airport. In the embodiment shown in FIG. 1, a merge point 16 establishes a transition between the descent phase 6 of the aircraft's flight trajectory to the low altitude phase 14. A final approach fix 18 aligns the aircraft 2 for its final descent to a touchdown point 20 on the airport's runway 22.

As shown in FIG. 1, there are no other aircraft in the area. Therefore, the airport and its ATC system will not intervene and instruct the pilot to change speed, level off, or change flight trajectory to avoid getting to close to another aircraft. Thus, in this scenario, the pilot enjoys the benefit efficient fuel use, flight time, etc. that was planned at the TOD 12.

Now referring to FIG. 2, another aircraft 24 is now in the local area of the first aircraft 2. The second aircraft 24 has its own descent phase 26, and accordingly, another set of flight path shadow lines 28 and resulting ground path 30 are provided. As mentioned above, the airport and its ATC may establish a series of waypoints that aircraft must travel through during the low altitude flight phase 14 of the flight trajectory. So as the first aircraft 2 and the second aircraft 24 travel through their respective descent phases 6, 26 and towards the merge point 16, the paths of the two aircraft 2, 24 begin to converge. In some instances, the distance between two aircraft 2, 24 may become too small, and the two aircraft will have less than the desired safe separation at the merge point and there is a risk of possible collision. Under the FAA's Order JO 7110.65 Air Traffic Organization Policy (Policy), Section 5 stipulates the minimum separation requirements when using radar procedures to separate aircraft. The minimum separation depends on the type of radar being used and the distance aircraft are from a single radar antenna. The minimum separation is typically at least 5 miles when aircraft are 40 miles or more from the antenna, and aircraft must be separated by at least 3 miles when aircraft are less than 40 miles from the antenna. Section 5 of the Policy has further standards for different types of aircraft, surveillance systems, and other scenarios. Thus, the airport and its ATC must maintain certain distances between aircraft in accordance with the FAA's 7110.65 Policy.

In FIG. 3, the two aircraft 2, 24 become too close under the FAA's Policy as the two aircraft 2, 24 begin their respective descent paths 6, 26 toward the merge point 16. Thus, the ATC instructs the first aircraft 2 to deviate from its planned descent phase 6 onto a long vector 32, which veers the first aircraft 2 far outside of its intended flight trajectory. While the ATC's instructions are necessary to comport with the FAA's Policy, the long vector 32 disrupts the first aircraft pilot's intended goal when the TOD 12 and the descent segment 6 were planned. For example, the long vector 32 may burn additional fuel when the pilot intended to conserve as much fuel as possible. In another example, the long vector 32 takes more time to reach the touchdown point 20 when the pilot intended to achieve a faster arrival time when the pilot originally planned the TOD 12 and the descent phase 6.

The vast majority of aircraft do not have equipment that receives state vector information from other aircraft in the same area. Instead, pilots simply plan their TODs and their descent phases ignorant of the air traffic in the local area, and the pilots subsequently rely on the airport and its ATC system to maintain the requisite distance between aircraft. Thus, in most cases, a pilot plans a TOD and a descent phase that will eventually be in conflict with other aircraft and the FAA's Policy before the aircraft actually crosses the TOD and begins the descent phase.

Figure 4:
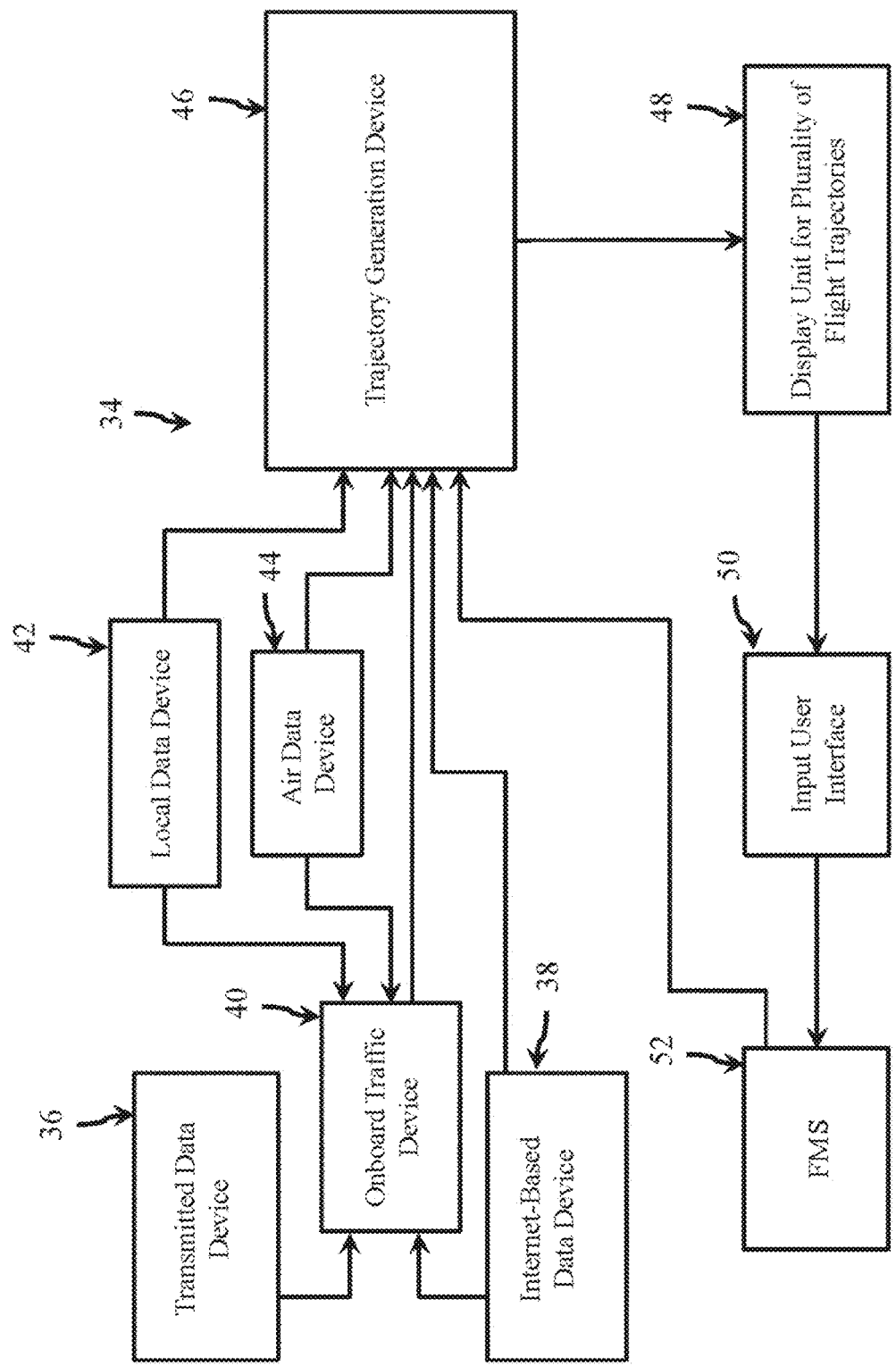
FIG. 4 is a Traffic Avoidance Spacing (TAS) system that generates a plurality of conflict-free flight trajectories.

FIG. 4 shows a flowchart for a Traffic Avoidance Spacing (TAS) system 34 that receives broadcasted state vector information from other aircraft in the area, receives information about the instant aircraft, optionally receives other relevant information, and then generates a plurality of possible flight trajectories. First, the TAS system 34 has a transmitted data device 36 that accumulates transmitted traffic and airspace data from sources external to the instant aircraft. This transmitted data may include data received from Automatic Dependent Surveillance-Broadcast (ADS-B) systems. ADS-B equipped aircraft may broadcast state vector information to other aircraft in the area or to ADS-B stations, which re-broadcast the information. State vector information may include information about the aircraft's location in space, altitude, climb/descent information, etc.

Additional components of the ADS-B system may be sent to the transmitted data device 36. For example, Traffic Information Services-Broadcast (TIS-B) provides data on non-ADS-B equipped aircraft to ADS-B equipped aircraft. TIS-B allows ground radar to track non-ADS-B equipped aircraft and then relay that same information to ADS-B equipped aircraft. Another component of ADS-B is Flight Information Services-Broadcast (FIS-B), which provides National Weather Service reports, temporary flight restrictions, and other information to equipped aircraft to receive ADS-B.

The TAS system 34 may also comprise an internet-based data device 38 which receives supplementary data that does not fit within the transmitted traffic and airspace data described above. The internet-based data device 38 may receive weather reports from the National Oceanic and Atmospheric Administration, special use airspace information, the intended trajectory of proximate aircraft, wind information, Airport Surface Detection Equipment runway conflict information, Multilateration technology, Nexrad S-Band Doppler weather radars, etc.

Next, onboard sensors may gather information about the instant aircraft. A local data device 42 may generate state vector information, which can include information about the instant aircraft's location in space, altitude, climb/descent information, etc. Further, an air data device 44 may gather data regarding airspeed and atmospheric conditions around the instant aircraft.

An onboard traffic device 40 calculates the state vector information of the instant aircraft and the various aircraft in the area. The transmitted data device 36, the internet-based data device 38, data from the local data device 42, and data from the air data device 44 may be combined and rectified in the onboard traffic device 40. In other words, data from these disparate sources may be combined to formulate a single data set for the immediate aircraft 2 and other aircraft in the area. For example, state vector information from Source A may be more accurate than state vector information from Source B. Therefore, the onboard traffic device 40 records state vector information from Source A unless Source A is not available, then the onboard traffic device 40 uses state vector information from Source B. This hierarchical knock-out system of combining data is only one example. In other embodiments, the data from the various sources may be averaged using methods known in the art to derive single sets of data for other aircraft in the area or the instant aircraft. Once the data from the various sources is combined, the data is sent from the onboard traffic device 40 to a trajectory generation device 46, which generates a plurality of flight trajectories.

One method for synthesizing flight trajectories is to use point-mass equations of motion. With the assumption of flat earth, constant acceleration of gravity, and quasi-steady mass, the resulting point-mass equations of motion may include:

$$V_t = \{(T-D)/m\} - g \sin \gamma_a \qquad (1)$$

$$\Psi_I = (g/V_g) \tan \varphi \qquad (2)$$

$$h = V_t \sin \gamma_a + W_h \qquad (3)$$

$$x = V_t \cos \gamma_a \sin \Psi_a + W_x \qquad (4)$$

$$y = V_t \cos \gamma_a \cos \Psi_a + W_y \qquad (5)$$

$$s = V_t \cos \gamma_a + W_s = V_g \qquad (6)$$

$$m = -m_f(T, M, h_p) \qquad (7)$$

Lift and drag are expressed as:

$$L = (\frac{1}{2})\rho(V_t)^2 SC_L \qquad (8)$$

$$D = (\frac{1}{2})\rho(V_t)^2 SC_D \qquad (9)$$

Mach number is defined as:

$$M = (V_t)/(1.4R\Theta)^{1/2} \qquad (10)$$

In subsonic flight, the calibrated airspeed (CAS) is related to Mach number, pressure, and temperature through:

$$V_{CAS} = \{7R\Theta_{SL}(\{(p/p_{SL})[(0.2M^2+1)^{3.5}-1]+1\}^{2/7}-1)\}^{1/2} \qquad (11)$$

Table I is provided below to identify the various the various constants and variables in equations 1-11.

TABLE I

Summary of constants, coefficients, and variables for the point-mass equations.

| | |
|---|---|
| $C_L, C_D$ | (Lift, Drag) coefficient |
| D | Aerodynamic drag |
| g | Acceleration of gravity |
| h, $h_P$ | (Geometric, Pressure) altitude |
| L | Aerodynamic lift |
| m | Aircraft mass |
| $m_f$ | Fuel consumption |
| M | Mach number |
| s | Path length variable |
| p | Pressure |
| $p_{SL}$ | Sea-level pressure |
| R | Specific gas constant, turn radius |
| S | Wing platform reference area |
| T | Thrust |
| v | Velocity |
| $V_t$ | True airspeed |
| $V_{CAS}$ | Calibrated airspeed |
| $V_g$ | Ground speed |
| $W_x, W_y, W_h$ | East, North, Up wind components |
| $W_s$ | Path length wind component |
| x, y | East, North coordinate |
| $(\gamma_a, \gamma_I)$ | (Air-relative, Inertial) flight path angle |
| $\varphi$ | Bank angle |
| $\rho$ | Air density |

TABLE I-continued

Summary of constants, coefficients, and variables for the point-mass equations.

| | |
|---|---|
| $(\Psi_a, \Psi_I)$ | (Air-relative, Inertial) heading angle measured clockwise from the North |
| $\Theta$ | Outside air temperature at altitude |
| $\Theta_{SL}$ | Sea-level temperature |

A standard avoidance interval (SAI) is described in greater detail below in FIGS. 5A and 5B and other figures. A SAI is a spacing interval that is assigned to other aircraft in the area. Thus, the instant aircraft can set a spacing of greater than 4 miles from the nearest aircraft when the FAA's Policy requires only 3 miles of spacing. As a result, the instant aircraft will most likely not receive a request from an ATC to change speeds, fly level, or completely deviate from the aircraft's intended flight trajectory.

Information from the onboard trajectory generation device 46 may include the established, current flight trajectories but may also include inputs or constraints such as wind information, thunderstorm warning information, special use airspace status information, ATC sector and sector loading information, turbulence information, as well as other hazards to aviation and proprietary information from the airline operation control via the internet. However, it will be appreciated that the trajectory generation device 46 does not need all of these sources to generate a plurality of flight trajectories. For example, in one embodiment, only the data from the onboard traffic device 40 is used to generate a plurality of flight trajectories.

However, information regarding the wind at various waypoints may be useful to avoid weather events such as turbulence or to more effectively conserve fuel. The magnitude and directions of wind at a matrix of waypoints where wind information is available can be expressed as:

$$W_{fw}(W_i, h_j), \psi_{fw}(W_i, h_j), i=1,\ldots,N_w; j=1,\ldots,N_h \qquad (12)$$

where $W_{fw}$ is the forecast wind magnitude, which is a function of wind magnitude W at various altitudes h, and $\psi_{fw}$ is the forecast wind direction, which is also a function of wind magnitude at various altitudes. $N_w$ is the number of waypoints at which wind information is available, and $N_h$ is the number of altitude levels at each waypoint where wind forecast data is available. A wind interpolation or approximation scheme can then be used to determine the wind magnitude and direction at a generic position and altitude.

$$W_m(s, h), \psi_w(s, h) \qquad (13)$$

The East and North wind components $W_x$ and $W_y$ used in trajectory synthesis can be determined from:

$$W_x = W_m \sin \psi_w, W_y = W_m \cos \psi_w \qquad (14)$$

where $\psi_w$ is the wind direction measured clockwise from North. An estimate for the wind at any point synthesized during trajectory generation can be found by locating neighboring waypoints where forecast winds are available, estimating the wind at the current altitude on each of the neighboring waypoints using vertical interpolation, and then estimating the wind at the current position and altitude by horizontally interpolating the winds between the two neighboring waypoints. The sensed wind information may be blended with interpolated wind information to provide the most likely winds at points in the trajectory ahead of the aircraft.

With the requisite information gathered, the trajectory generation device 46 may generate a plurality of flight trajectories that are conflict free, which means that the flight trajectories do not cause the instant aircraft to travel into a SAI of another aircraft, a weather event, special use airspace, etc. For some embodiments of the present invention the trajectory generation is contemplated to occur onboard the aircraft. However, it will be appreciated that the same calculations could occur anywhere, provided the relevant data is available.

The generation of flight trajectories may comprise two major components, the generation of the horizontal path and the generation of the vertical path over the defined horizontal path. As an example, a Dijkstra algorithm can be used to explore the airspace around the aircraft out to the destination or to the limit of available information (i.e., the limit of available surveillance data could be defined as the air-to-air grange of ADS-B or the limit of surveillance data supplied to the system via the internet). The points generated by a Dijkstra algorithm can be determined by using a discrete search technique to find a trajectory that avoids traffic conflicts, special use airspace, avoids hazardous weather, avoids extending over water routing while accounting for ANSP sector boundaries and sector loading. The series of waypoints generated by the Dijkstra methodology are also subject to aircraft speed and bank angle limitations. Aircraft performance data can be supplied by the aircraft manufacturer or generic values can be looked up on a collection of American Standard Code for Information Interchange (ASCII) files equivalent to the Base of Aircraft Data (BADA) maintained by EUROCONTROL.

A Dijkstra algorithm can be used to generate a series of waypoints that expands outward from the aircraft's current position or another selected starting point, interactively considering every waypoint that requires optimization for a parameter (e.g., the least amount of fuel burn or least amount of time), moving from waypoint to waypoint until the algorithm reaches the destination or a point where the reference trajectory can be rejoined.

The Dijkstra methodology determines the next waypoint in a series of incremental steps to the destination. In the case where the trajectory is determined onboard the aircraft the position of each "next waypoint" could be limited to waypoints contained within the FMS or limited to all possible waypoint definable by the fidelity of latitude and longitude calculations of the FMS.

To determine a range of suitable flight trajectories, a ranked list of less-than-optimal flight trajectories is found by first determining the optimal flight trajectory then searching for a flight trajectory with the optimal solution suppressed. This process is then iteratively repeated until the boundaries of the optimized parameter(s) (e.g., excess fuel burn or elapsed time) are reached. The optimal and ranked subsequent flight trajectories can be presented for selection by the pilot or the automation.

Just as the Dijkstra methodology is applied to determine the range of suitable flight trajectories in the horizontal plane, the same methods can be applied simultaneously in the vertical plane to generate a 4-dimensional trajectory. In addition to using the Dijkstra methodology to generate a 4-dimensional trajectory, a vertical profile can also be constructed over the horizontal path determined above. In this case the vertical profile consists of a series of flight segments starting from the initial position to runway threshold.

The vertical path may be segmented into phases that have different or changing values for airspeed, Mach, CAS, altitude, aircraft configuration, flight path angle and thrust. The phases include climb, cruise, descent to the Mach-CAS transition altitude, constant CAS descent to a metering fix with a speed constraint or a CAS descent to the 250 KT deceleration altitude, a deceleration to the maneuvering speed for intercepting the final approach phase, descent and decelerating configuration on the final phase. In addition other variables to the generation of a vertical profile include initial aircraft conditions, aircraft performance parameters, flight procedures associated with compliance of ATC regulations and atmospheric conditions such as turbulence and icing conditions. Aircraft performance data can be supplied by the aircraft manufacturer or generic values can be looked up on ASCII tables. The equations of motion for each of these phases are obtained from the general point-mass model contained in equations 1 through 11 above. A first-order Euler integration scheme is then used for the proper integration with the horizontal path.

The generation of a new vertical path over the existing reference trajectory flight path during the both descent and climb phases of the flight trajectory present a special case because the vertical path can be modified by adjusting the speed profile of the aircraft with a constant thrust setting.

Moving to the next portion of the flowchart in FIG. 4, the plurality of flight trajectories are presented in a display unit 48. A pilot may readily thumb through the plurality of flight trajectories and determine which flight trajectory best suits the operational requirements of the flight. Therefore, for example, a pilot may select the flight trajectory from an input user interface 50 of the display unit 48 that is going to provide the most fuel efficient descent phase of a flight, and the pilot knows that there is little or no risk of receiving an intervention by an ATC because the system 34 incorporates SAIs. In some embodiments, the airline may have an automated system that, at the input user interface 50, selects a flight trajectory from the plurality of flight trajectories based on one or more parameters. For example, an airline may value fast flight times above all else, and thus, the airline would have the automated system select the flight trajectory with the fastest arrival descent time.

Once the selection has been made a FMS 52, or the flight management device, uses the selected flight trajectory to establish a TOD and a speed profile to have the aircraft 2 travel on the selected flight trajectory.

Figure 5:
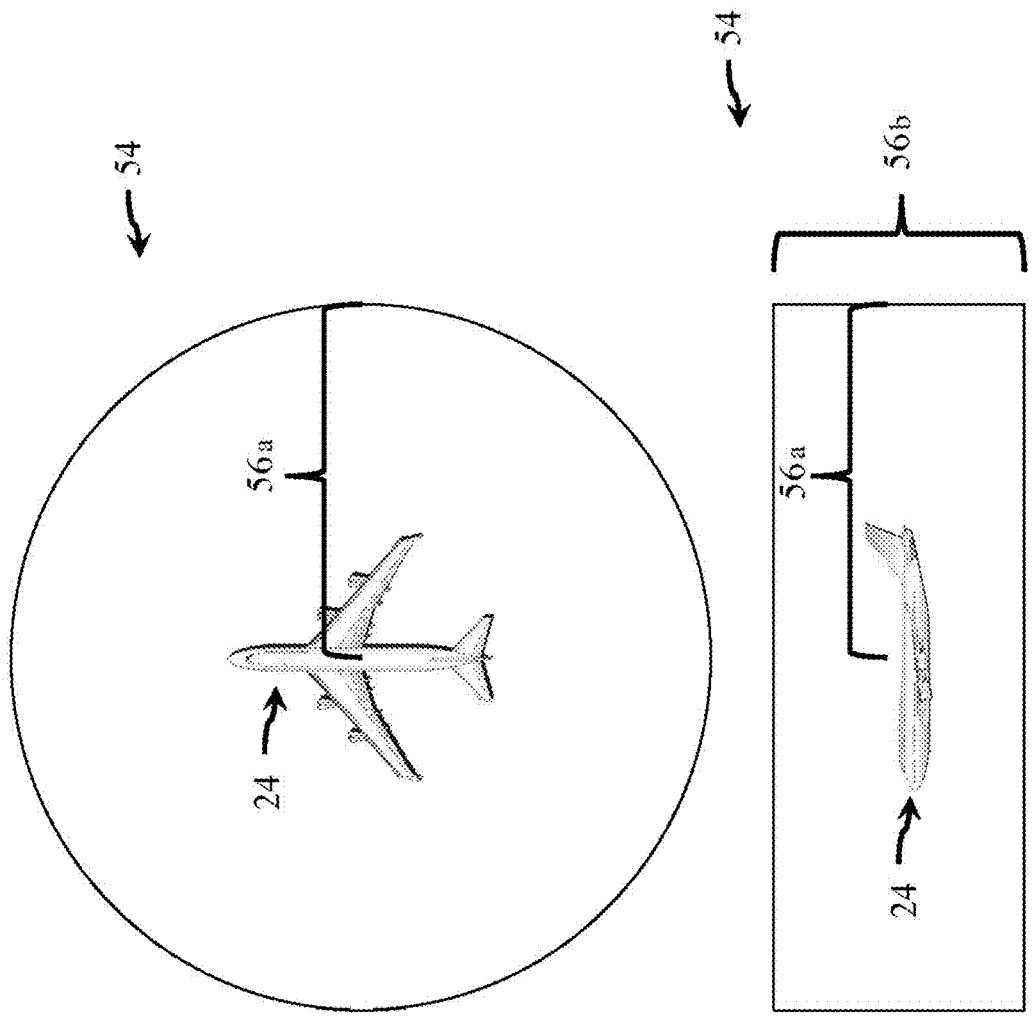
FIG. 5A is a top plan view of a second aircraft that has been assigned a Standard Avoidance Interval (SAI)
FIG. 5B is a side elevation view of a second aircraft that has been assigned a SAI.

FIGS. 5A and 5B depict a second aircraft 24 that has been assigned a SAI 54 or a Standard Avoidance Interval. As noted above, an aircraft may assign a SAI to a second aircraft 24 in the area, and the SAI 54 may be more conservative than FAA standards such that the aircraft does not incur an intervention by an ATC. Thus, in some embodiments the SAI assigned to another aircraft creates a separation between two aircraft that is larger than the separation maintained by an ATC under FAA's JO 1710.65 standard. As shown in FIG. 5A, the SAI 54 is an area or defined space that extends in a lateral or horizontal dimension 56a from the second aircraft 24 about a vertical axis, which, in some embodiments, may be positioned over the second aircraft's geometric center or center of mass.

FIG. 5B shows the SAI 54 extending in a lateral dimension 56a from the second aircraft 24 as well as a vertical separation distance 56b extending above and below the second aircraft 24. The vertical separation distance 56b functions much the same way as the lateral dimension 56a of the SAI 54. When the TAS system 34 generates a plurality of flight trajectories, the TAS system 34 avoids conflicts between the TAS-equipped aircraft and the vertical separation distance 56b of the second aircraft 2. In some embodiments, the vertical separation distance 56b may extend 1000 feet above the second aircraft 24 and 1000 feet below the second aircraft 24. Further, the vertical separation distance

56b may be centered on a geometric center or a center of mass on the second aircraft 24.

The resulting space surrounding the second aircraft 24 is a three dimensional defined space, and more particularly a cylinder because the lateral dimension 56a of the SAI 54 is a constant radius from a vertical axis and the vertical separation distance 56b is expressed in terms of altitude above and below the second aircraft 24. However, it will be appreciated that embodiments of the invention are not limited to these shapes. For example, the SAI 54 may be an ovoid shape that encompasses a larger area behind the second aircraft 24 to account for wake behind the second aircraft 24. Further, the SAI may be a different size and shape during different phases of a flight because the FAA has different standards during different phases of the flight. For instance, the enclosed volume of the standard avoidance interval may comprise a spheroid shape that is dependent on at least one of the speed, performance, size, configuration and type of aircraft, proximity to an ATC boundary or airport, and point in the flight trajectory.

Various entities may establish different standards, sizes, and shapes for SAIs. A manufacturer, for example of aircraft, may establish a SAI during certification to avoid conflict with other aircraft. The aircraft operator and the pilot may also establish various SAIs. In instances where different entities establish different SAIs, an entity may create a more conservative SAI (i.e., larger SAD. In one example, the manufacturer establishes a SAI having a first size, and the airline operator establishes a SAI having a second size. The second size is larger and more conservative than the first size. Subsequently, a pilot has the freedom to establish a third SAI that is larger and more conservative than either the first size or the second size. In other embodiments, a party with greater authority may wish to overrule any attempt to establish a larger and more conservative SAI.

Figure 6:
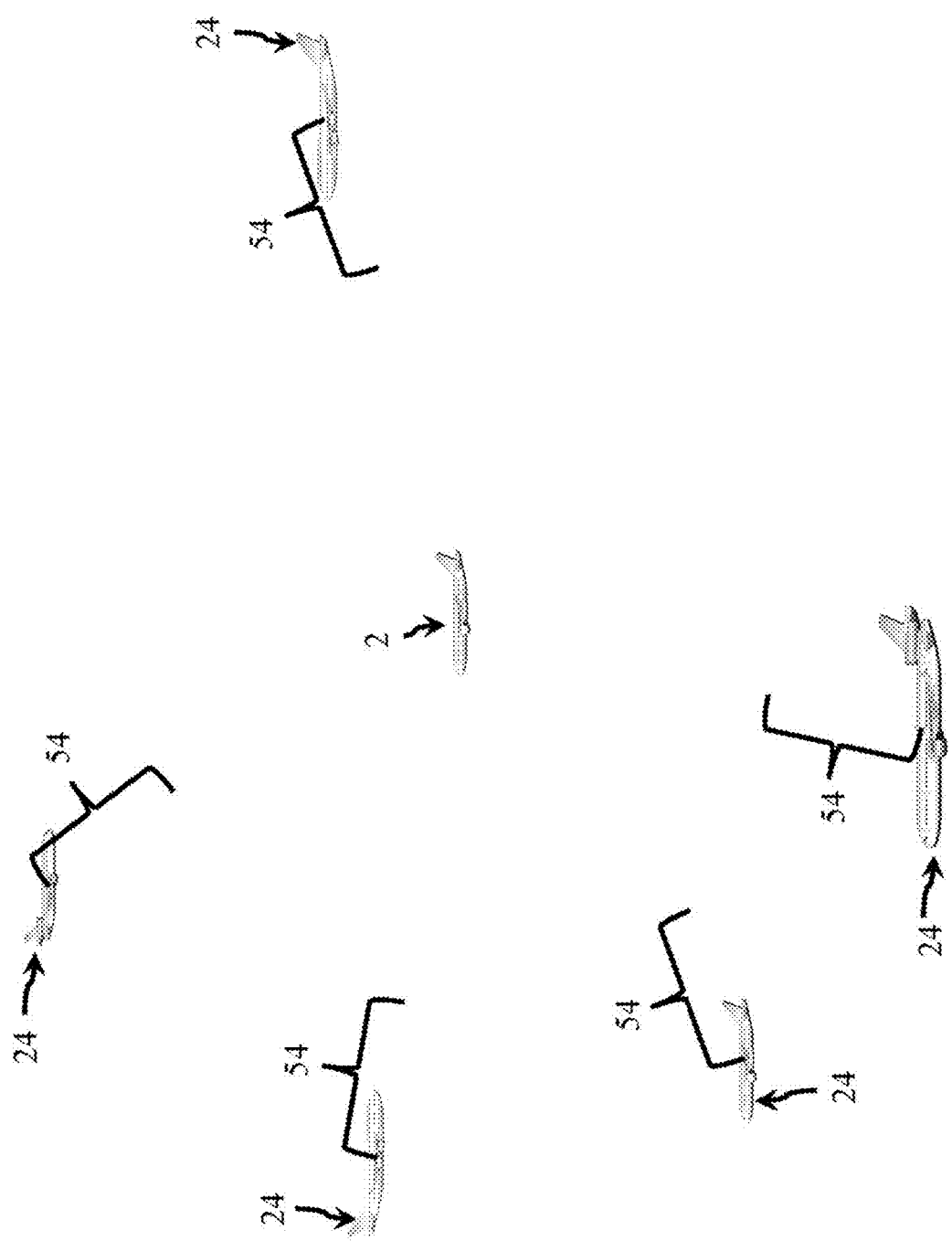
FIG. 6 shows a first aircraft surrounded by several second aircraft in the area where the second aircraft have been assigned a SAI.

FIG. 6 shows an instant aircraft 2 that is equipped with a TAS system 34 wherein there are several aircraft 24 in the local area. The TAS system 34 has received ADS-B data and state vector information broadcasted from other aircraft 24 in the area, and the TAS system 34 has assigned a SAI to the position of the other aircraft 24 for the purpose of calculating conflict-free flight trajectories. It will be appreciated that the TAS system 34 can assign a different SAI 54 to different aircraft 24 depending on several different factors including the size and type of aircraft 24, the aspects of the aircraft's 24 motion such as velocity and trajectory, the stage of the aircrafts' 2, 24 flights (e.g., descent phase or en route phase), etc.

Figure 7:
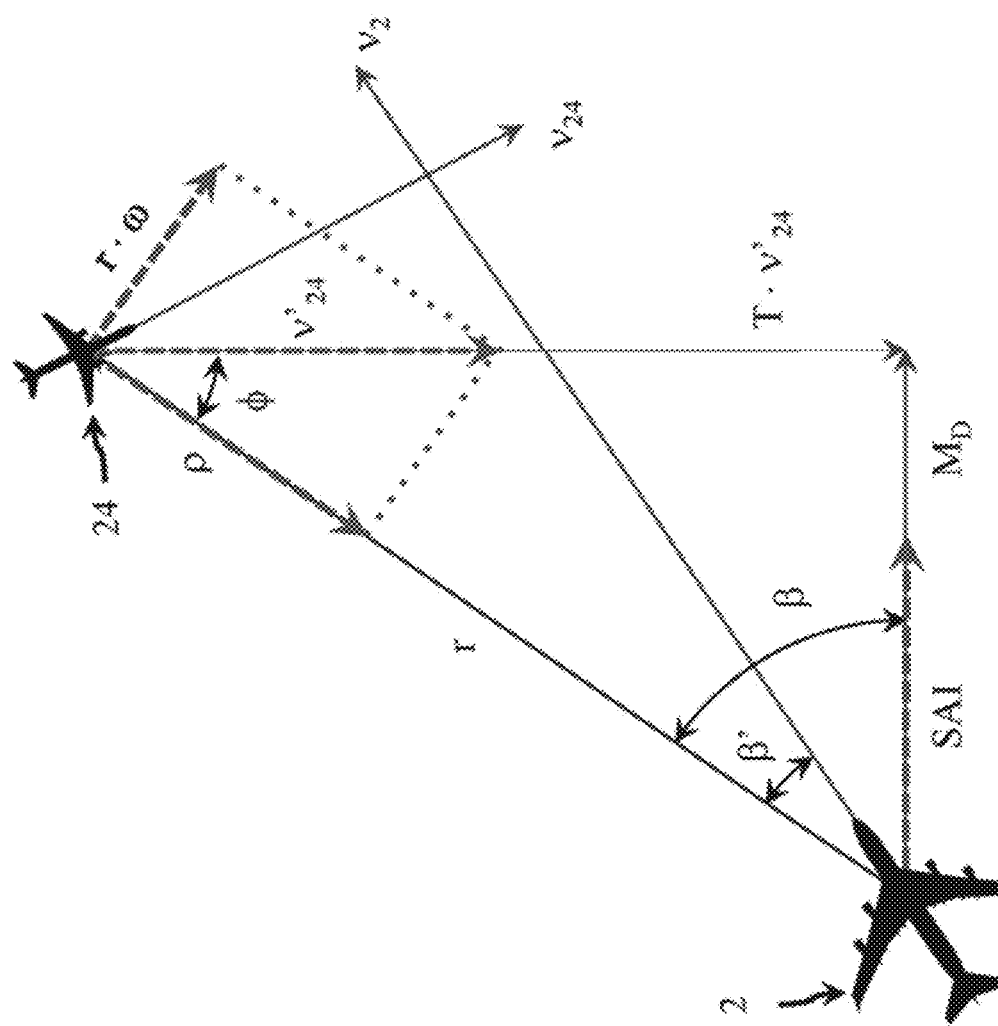
FIG. 7 is a top plan view of a first aircraft having a state vector and a second aircraft having a state vector where a miss distance between the two aircraft may be calculated using various geometric aspects of the respective state vectors.

FIG. 7 shows the geometry of two aircraft traveling toward each other and the resulting miss distance $M_D$ that may be calculated and subsequently compared to the SAI 54. The TAS system 34 may calculate a miss distance $M_D$, or the closest distance that two aircraft will pass relative to each other, based on the state vector information of the instant aircraft 2 and the second aircraft 24. First, the range r may be calculated with the use of variables a and c, which can be determined by using the Haversine formula:

$$a = \sin^2(\Delta\varphi/2) + \cos\varphi 1 \cdot \cos\varphi 2 \cdot \sin^2(\Delta\lambda/2) \tag{15}$$

$$c = 2 \cdot a\tan 2\{(a)^{1/2}, (1-a)^{1/2}\} \tag{16}$$

$$r = R_E c \tag{17}$$

where $\varphi$ is latitude (measured in radians), $\lambda$ is longitude (measured in radians), $R_E$ is earth's radius (mean radius≈6,371 km). Knowing the state vector information of the instant aircraft 2 and the second aircraft 24 also enables the determination of bearing β from the instant aircraft 2 to the second aircraft 24 using the equation:

$$\beta = a\tan 2(\sin\Delta\lambda \cdot \cos\varphi 2, \cos\varphi 1 \cdot \sin\varphi 2 - \sin\varphi 1 \cdot \cos\varphi 2 \cdot \cos\Delta\lambda) \tag{18}$$

The relative bearing β' can be determined by the instant tract angle from the position bearing β. The apparent velocity of the second aircraft 24 can be found by:

$$v'_{24} = \{(r\omega)^2 + \rho^2\}^{1/2} \tag{19}$$

$$\sin\varphi' = (r\omega)/v'_{24} \tag{20}$$

$$M_D = (r^2\omega)/v'_{757}(r^2\omega)/\{(r\omega)^2 + \rho^2\}^{1/2} \tag{21}$$

The TAS system 34 compares the miss distance $M_D$ of a flight trajectory to the SAI 54, and if the miss distance $M_D$ is less than the SAI, then the flight trajectory has a conflict. The calculations used to generate the miss distance $M_D$ may incorporate the velocity or acceleration of bearing β to account for dynamic flight trajectories. Further, the miss distance $M_D$ may incorporate information from local aircraft 24 that indicates where the aircraft 24 is ultimately traveling. For example, if the local aircraft 24 is traveling toward a merge point, a way point, or a particular airfield; then this information may be used to predict miss distances $M_D$ and potential future conflicts for flight trajectories. Therefore, a known flight trajectory of a second aircraft may be used to calculate a plurality of miss distances using the prescribed SAI along the length of the known flight trajectory. It will be appreciated that the SAI may change size and shape at various points along the known flight trajectory for a variety of factors discussed elsewhere herein. In addition, the known flight trajectory may include complete flight trajectories and even incomplete flight trajectories.

Figure 8A:
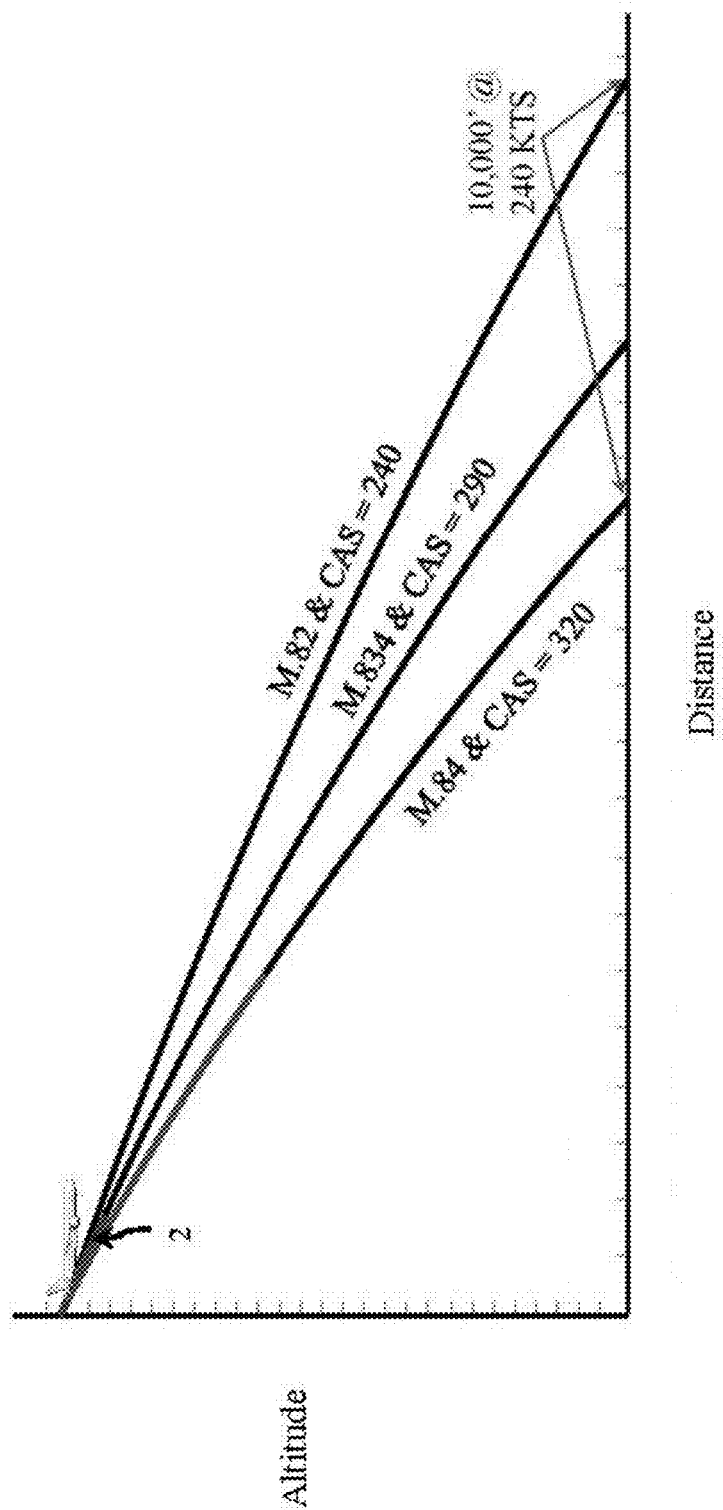
FIG. 8A illustrates three descent trajectories selected from a plurality of descent speeds for the descent phase of a flight where the Top of Descent (TOD) points for different descent trajectories are superimposed on each other and indicate that the various trajectories used in descent can be used to reach a different point at the end of the chosen descent phase.
Figure 8B:
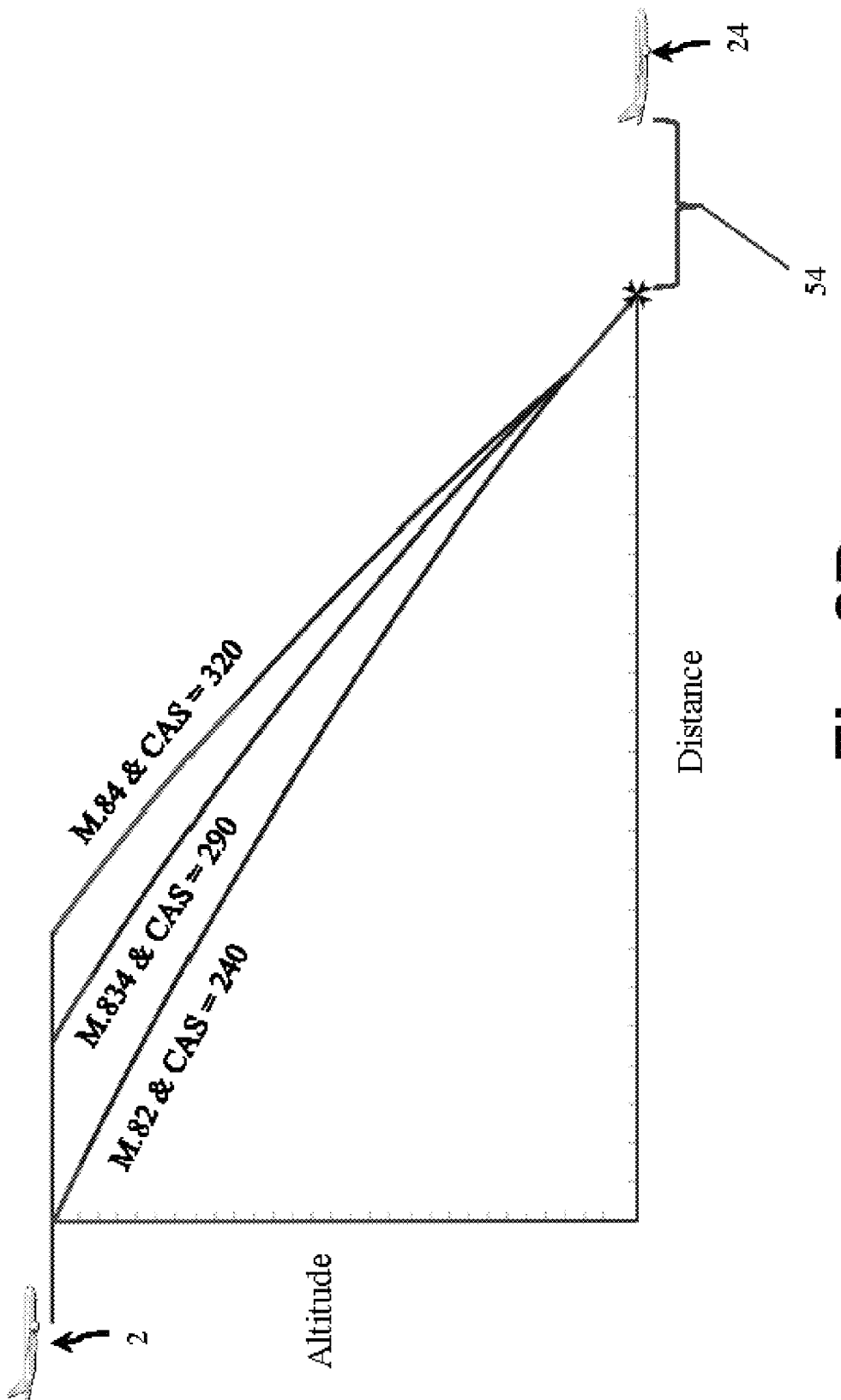
FIG. 8B illustrates three descent trajectories selected from a plurality of descent speeds for the descent phase of a flight where the various end of descent points of each descent trajectory are superimposed on each other and indicates that the various trajectories used in descent can all be used to avoid a second aircraft by the same SAI.

FIGS. 8A and 8B depict how variable speed profiles can impact the miss distance between two aircraft relative to a SAI assigned to a second aircraft. FIG. 8A illustrates three different speed profiles starting from the same altitude and measured using a Mach number and a Calibrated Airspeed (CAS). The fastest descent speed results in the shortest lateral distance traveled by the aircraft 2. Conversely, the slowest descent speed results in the longest lateral distance traveled by the aircraft.

Turning to FIG. 8B, the three speed profiles from FIG. 8A are reordered such that the three speed profiles intersect at the same point behind a second aircraft 24. Therefore, the instant aircraft 2 can remain at cruising altitude the longest with the fastest speed profile since the fastest speed profile results in the shortest lateral distance traveled by the aircraft 2, and vice versa for the shortest speed profile. Therefore, embodiments of the TAS system 34 may also account for desirable speed profiles while maintaining the desired distance from other aircraft 24.

Figure 9:
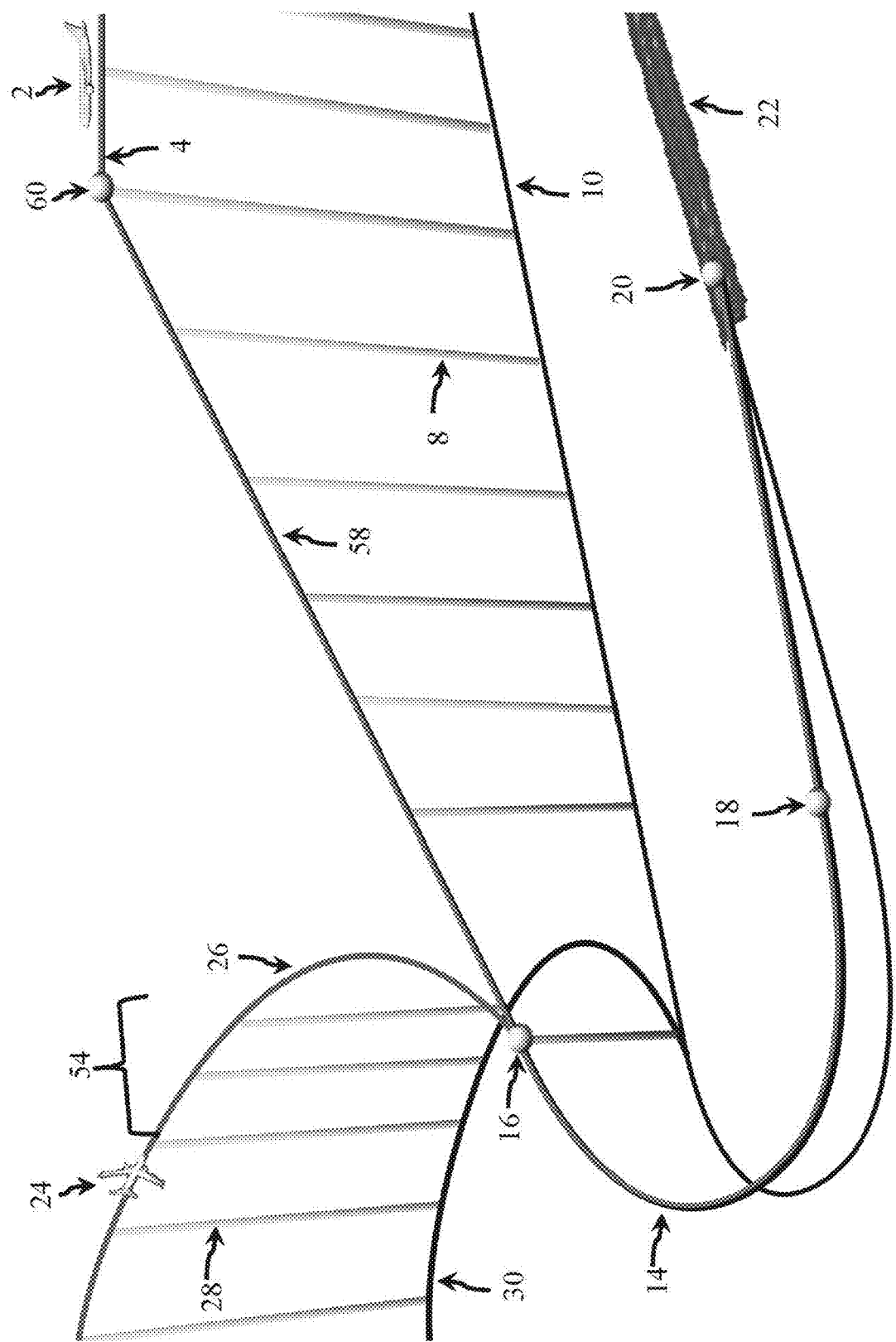
FIG. 9 illustrates an aircraft equipped with a TAS system entering a descent phase of a flight trajectory toward a merge point where another aircraft that has been assigned a SAI is also traveling toward the merge point.

FIG. 9 depicts a TAS equipped aircraft 2 traveling on an en route phase 4 of a flight trajectory where another aircraft 24 is in the area, and both aircraft 2, 24 are traveling toward a merge point 16. Since the instant aircraft 2 is equipped with a TAS system 34, the pilot selects among a plurality of flight trajectories that have a generally lower speed profile, which allows the second aircraft 24 to reach the merge point first. There are many idle thrust descent speed profiles that will allow the TAS equipped aircraft 2 to avoid a conflict with the second aircraft 24. This range of idle thrust descent-speed-profiles are bounded by avoiding traffic conflict and the use of operationally sound speeds. The TAS system has assigned a SAI 54 to the second aircraft 24 based on, for example, the type of aircraft, the stage of the flight, and the proximity to an airport and runway 22. The lower speed descent segment 58 and the associated TOD 60 allow the instant aircraft 2 to achieve a miss distance between the two aircraft 2, 24 that is equal to or greater than the SAI assigned to the second aircraft 24.

By selecting one of the idle thrust descent-speed-profiles from the plurality of descent speed trajectories generated by the TAS the pilot avoids an intervention by an ATC which would cost the pilot even more time.

It will be appreciated that embodiments of the present invention may be applied to any phase of the flight including the climb phase, the en route phase, and the low altitude phase before landing. During the low altitude, final approach phase, assignment of a SAI to other proximate aircraft ensures the TAS equipped aircraft does not conflict with either traffic ahead of or behind the equipped aircraft while providing guidance to achieve a stabilized approach.

It will be further appreciated that the SAI assigned to other aircraft 24 may be different depending on the phase of the flight where the merge SAI is expected to be achieved. FAA Policy allows for a smaller distance between aircraft on approach as opposed to the en route phase of a flight. Accordingly, the TAS on the instant aircraft 2 may set a smaller SAI 54 to the second aircraft 24 for a more fuel efficient, time efficient, etc. descent while avoiding any intervention by an ATC if the point is where the SAI is achieved is on approach as opposed to the en route phase of a flight.

Figure 10:
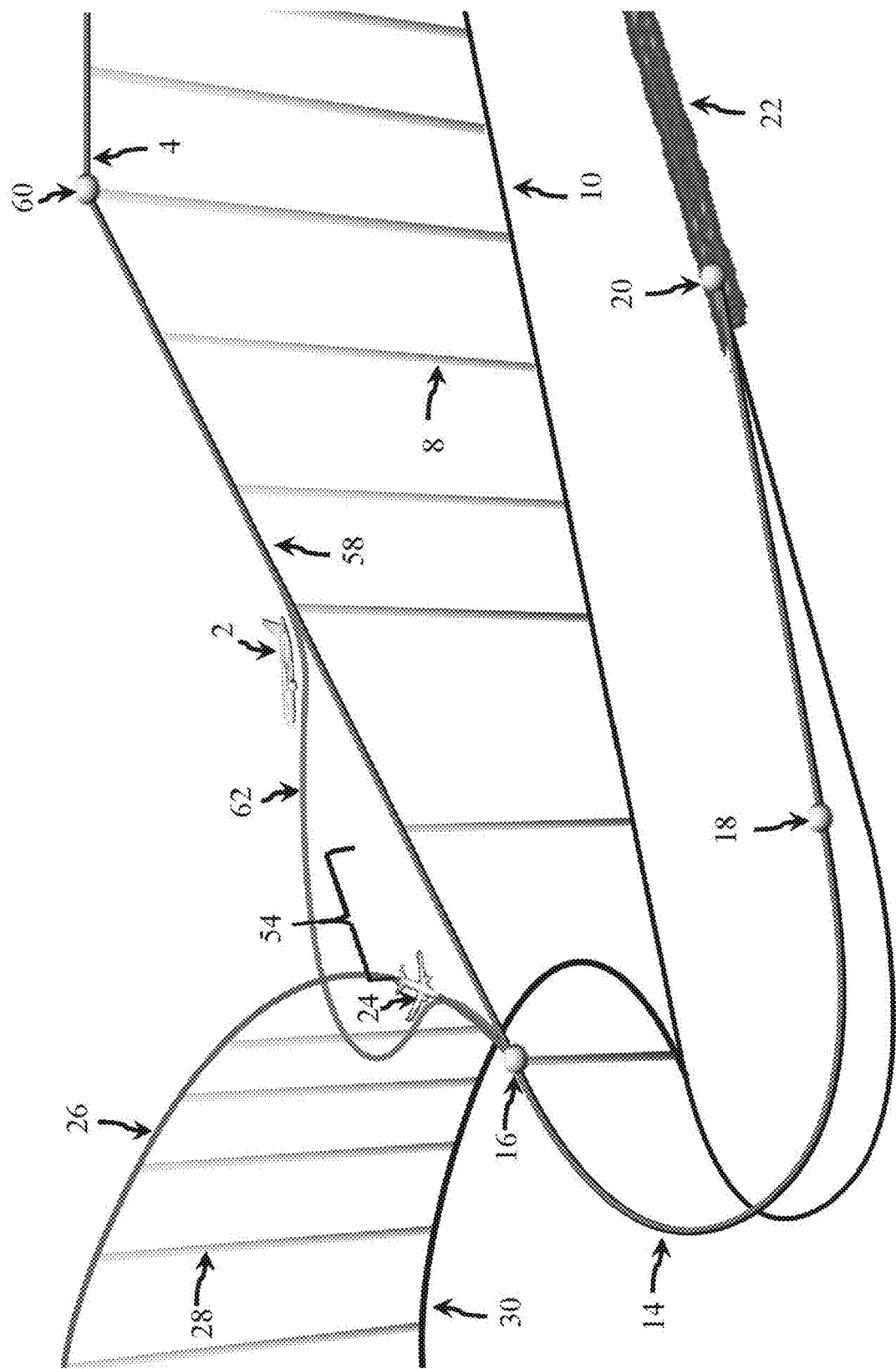
FIG. 10 illustrates an aircraft equipped with a TAS system entering a descent phase of a flight trajectory where the aircraft was vectored off course for a short distance because the aircraft was not able to fully meet the assigned SAI and remain on its planned descent path.

FIG. 10 shows the situation when safe separation and the associated SAI can only be achieved by having ATC assign the TAS equipped aircraft 2 a vector. While these vectors are undesirable, they may be unavoidable in some instances. In this case the instant TAS equipped aircraft 2 is coming off of an en route phase 4 and onto a descent phase 58 where another aircraft 24 is in the area, and both aircraft 2, 24 are traveling toward a merge point 16. Since the instant aircraft 2 is equipped with a TAS system 34, The TAS system has assigned a SAI 54 to the second aircraft 24 based on, for example, the type of aircraft, the stage of the flight, and the proximity to an airport and runway 22. If the geometry of the encounter between aircraft 24 and 2 prevents the TAS from providing a plurality of operationally sound descent-speed-schedules, then the TAS will use the SAI to calculate both a new en route 4 cruise speed and a single descent-speed-schedule which allows the second aircraft 24 to reach the merge point first and reduces the amount for off path vectoring 62 required by the TAS equipped aircraft 2. Thus, while ATC may extend flight path of the instant TAS equipped aircraft 2 by assigning it a short vector the TAS equipped aircraft 2 can reduce the length of the off path vector by providing the pilot with both a new en route 4 cruise speed and a descent-speed-schedule and FMS derived TOD 60 that minimizes the need for ATC intervention. The new en route 4 speed and lower speed descent segment 58 and the associated TOD 60 allow the instant aircraft 2 to reduce the amount of ATC intervention. It will be appreciated that the ability of the TAS system to propose changes to the flight path in different phases, including the en route phase 4, can be applied to any embodiment described herein.

Figure 11:
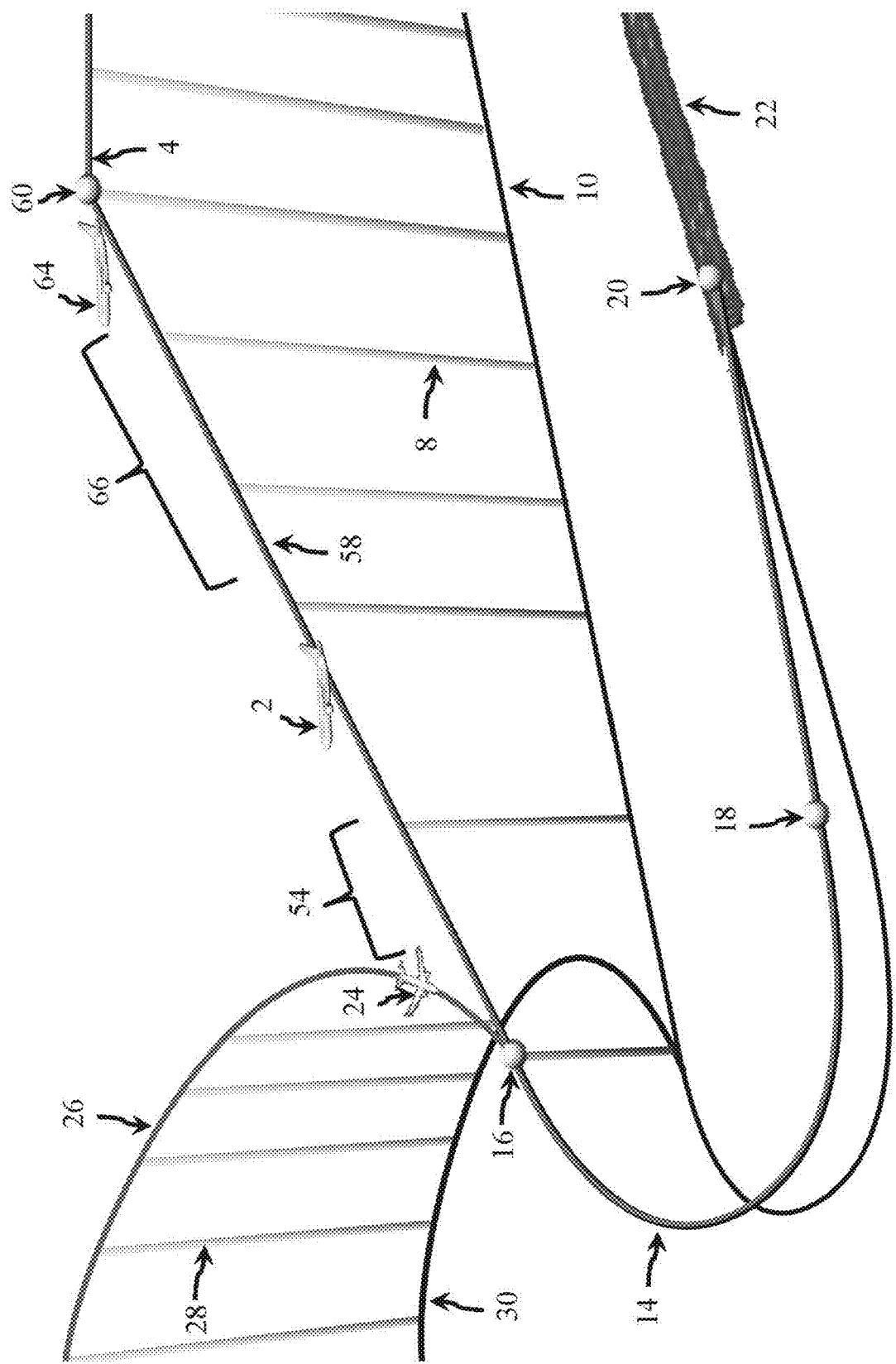
FIG. 11 illustrates an aircraft equipped with a TAS system entering a descent phase of a flight trajectory toward a merge point where a plurality of SAIs were used, and a single descent trajectory was selected from a plurality of conflict free descent trajectories that enables the TAS equipped aircraft to fly a continuous descent.

FIG. 11 shows a TAS equipped aircraft 2 where two other aircraft, a second aircraft 24 and a third aircraft 64, are in the area around the instant aircraft 2. Similar to FIG. 9, the second aircraft 24 is traveling on its own descent phase 26 toward a merge point 16. The instant aircraft's TAS system has assigned a SAI 54 to the second aircraft 24 to incorporate the constraint into the TAS system's generation of a plurality of flight trajectories. Also depicted in FIG. 11 is a third aircraft 64 that is behind the instant aircraft 2. The TAS system has assigned a larger SAI 66 to the third aircraft 64 based on various aspects of the third aircraft 64. Thus, when the TAS system of the instant aircraft 2 generates a plurality of flight trajectories, the TAS system will calculate a miss distances for each aircraft 24, 64 to provide a plurality of conflict-free flight trajectories that will avoid an intervention by the local ATC.

Figure 12:
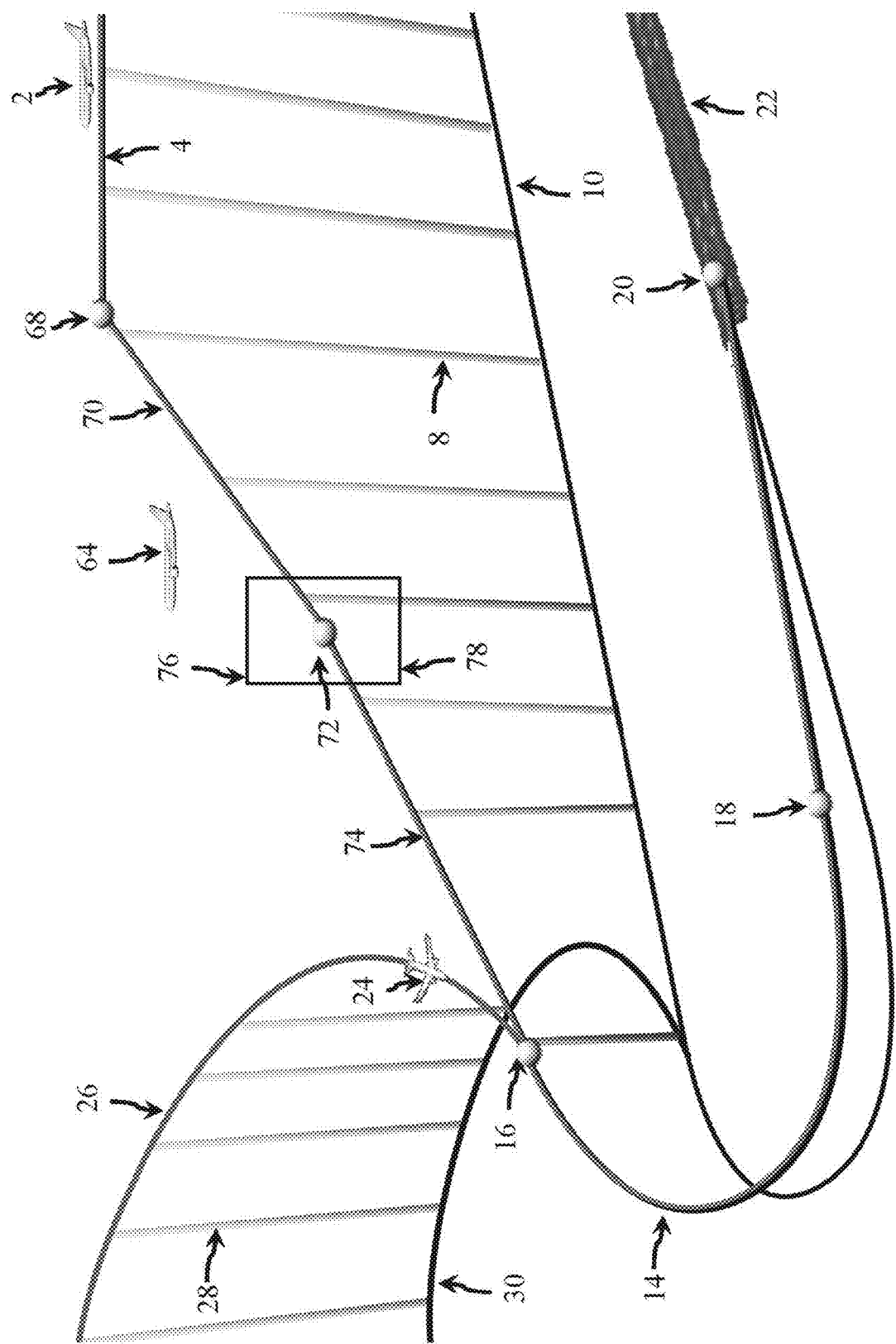
FIG. 12 illustrates an aircraft equipped with a TAS system entering a descent phase of a flight trajectory toward a merge point where a Traffic Avoidance Waypoint (TAW) has been generated and a single descent trajectory was then selected from a plurality of conflict free descent trajectories to enable the TAS equipped aircraft to avoid conflicts with multiple proximate aircraft and fly a continuous descent.

FIG. 12 illustrates an aircraft 2 that is equipped with a TAS system where there are a second aircraft 24 and a third aircraft 64 in the area. In this scenario, the second aircraft 24 is traveling toward the same merge point 16 as the instant aircraft 2. The third aircraft 64 is traveling across the descent phase of the instant aircraft's flight trajectory at a higher altitude than the instant aircraft 2, but the third aircraft 64 still presents a conflict to the flight trajectory of the instant aircraft 2. Therefore, the TAS system of the instant aircraft 2 may generate a multi-segmented descent phase where each segment has a constant speed, and the instant aircraft 2 avoids conflict with both the second aircraft 24 and the third aircraft 64. The TAS system may generate a descent phase that comprises a first segment 70 and a second segment 74 where the segments are joined at a Traffic Avoidance Waypoint (TAW) 72. The TAW 72 is positioned below the third aircraft 64 to avoid conflict with the vertical separation distance of the SAI assigned to the third aircraft 64. As a result, the first subsegment 70 has a first speed profile, and the second subsegment 74 has a second speed profile where the first speed is faster than the second speed. This multi-segment approach allows a TAS equipped aircraft to handle crossing aircraft in addition to the embodiment described in FIG. 11, where the third aircraft 64 is generally behind the instant aircraft 2 and traveling on a similar flight trajectory as the instant aircraft 2.

A plurality of TAWs may be generated, which provides a pilot of a TAS equipped aircraft with a number of options. Similar to the embodiments described in FIGS. 9-11, a pilot may select the particular TAW that best suits the preferences of the pilot, the airline, or any other entity. Then, an updated TOD 68 is calculated, and the new flight trajectory information is supplied to a Vertical Navigation (VNAV) system. The TAW crossing restriction may be a dynamically assigned waypoint that modifies the VNAV profile. The TAW may not make part of the VNAV path until the actual encounter geometries of proximate traffic are known. The TAW may be determined through the generation of the plurality of flight trajectories and may be entered into the FMS prior to the TOD.

During the descent phase of a flight, the ground path is generally fixed, and a plurality of TAWs may be provided at various altitudes above a reference point on the ground path. This reference point above the ground path may be selected by first identifying a miss point on the originally-planned flight trajectory that has the smallest miss distance with respect to the third aircraft 64. The ground path below this miss point on the originally-planned flight trajectory may then be used as a reference to provide a plurality of TAWs at various altitudes.

Other pluralities of TAWs may be provided in a two dimensional area or a three dimensional volume instead of a plurality of TAWs in just one dimension. In an exemplary embodiment, a plurality of TAWs is generated at various altitudes along a length of the ground path. Yet it will be appreciated that a two dimensional area of TAWs may not be positioned over the ground path. Further, in another exemplary embodiment, a plurality of TAWs is generated at various altitudes both on and off of the ground path to define a three dimensional volume. Further yet, a time component may be added to any of the TAWs as one or both of the instant aircraft 2 and the third aircraft 64 change trajectories and the miss distance between the two aircraft 2, 64 changes over time. It will be appreciated that miss distance between two aircraft may not be the only basis to calculate a plurality of TAWs. For example, TAWs may be established at a midpoint between an originally-planned TOD 68 and a merge point 16.

Next, limits 76, 78 may be established to remove TAWs that would create a flight trajectory with a conflict, for example, a conflict with a SAI assigned to another aircraft. A plurality of TAWs may be bound by an upper altitude limit 76 and/or a lower altitude limit 78. These limits 76, 78 may also be expressed in terms of other parameters such as airspeed. Thus, with the embodiment shown in FIG. 12, pilot may select a TAW 72, and the aircraft 2 may pass at or above a lower altitude limit 78 and at or below an upper altitude limit 76. In other embodiments, the aircraft 2 may pass at or above a lower limit 78 at a specific airspeed and at or below an upper limit 78; at or above a lower limit 78 at a specific airspeed and at or below an upper limit 78 at a specific airspeed; or at or above a lower limit 78 and below an upper limit 78 at a specific airspeed. In other embodiments, only one limit exists and in yet other embodiments, the two limits converge and the aircraft must cross at a specific altitude and/or airspeed to avoid having a conflict.

Since the third aircraft 64 in FIG. 12 is crossing at a higher altitude, the upper altitude limit 76 of the TAW 72 may be established by a SAI or a vertical separation distance assigned to the third aircraft 64. In contrast, the lower altitude limit 78 may be established by operational limitations of the instant aircraft 2 such as maximum time allowed, maximum fuel allowed, or any other parameter discussed elsewhere herein. Then the pilot or automated system may choose a TAW 72 that best suits the needs of the particular airline, flight, or any other parameter.

Figure 13:
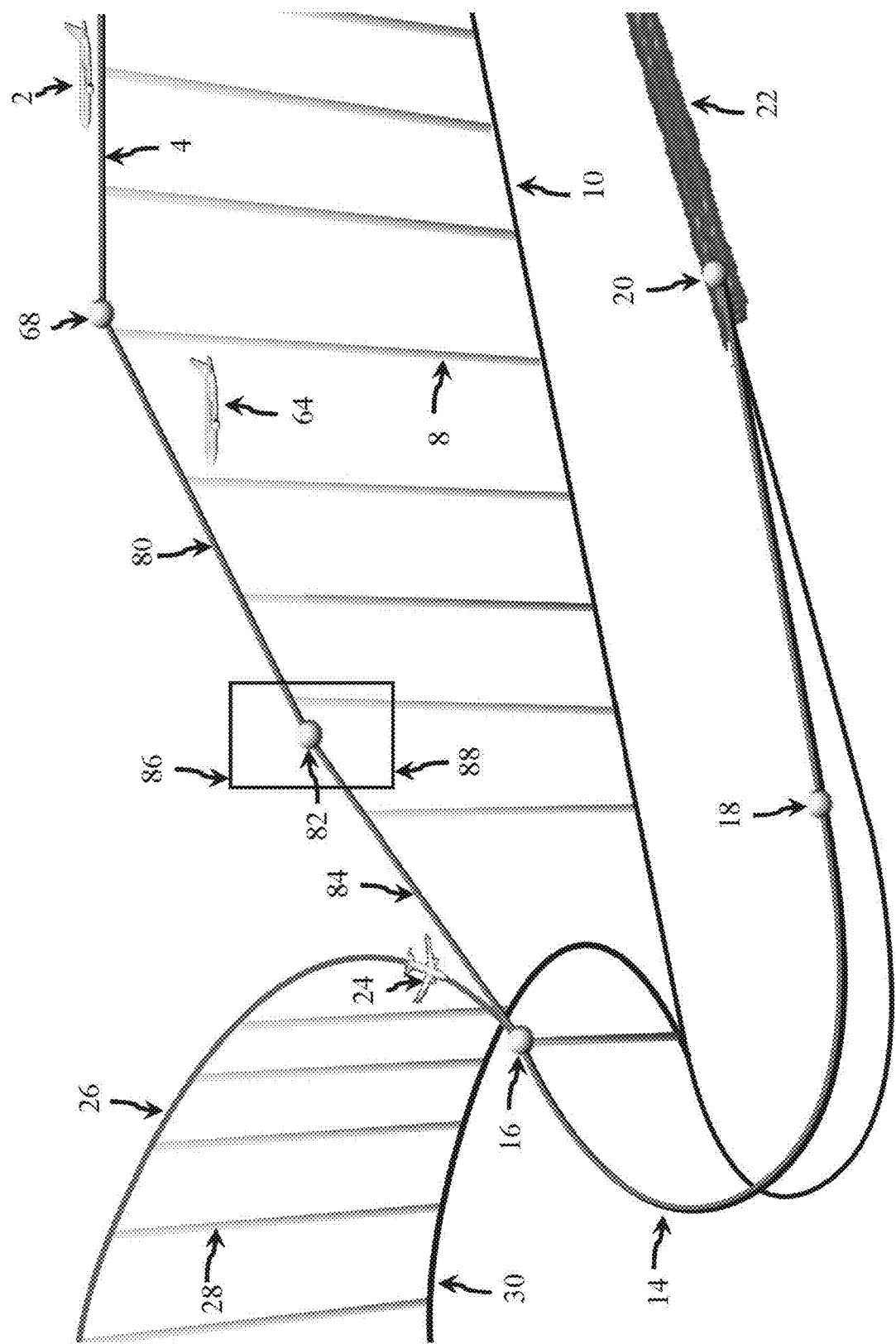
FIG. 13 illustrates an aircraft equipped with a TAS system entering a descent phase of a flight trajectory toward a merge point where a different TAW has been generated and a single descent trajectory was then selected from a plurality of conflict free descent trajectories to enable the TAS equipped aircraft to avoid conflicts with multiple proximate aircraft and fly a continuous descent.

The embodiment in FIG. 13 shows a flight trajectory and a descent phase that comprises two segments 80, 84 joined together at a TAW 82. However, in the embodiment shown in FIG. 13, the third aircraft 64 is crossing at a lower altitude. Therefore, the TAW 82 is positioned such that the first segment 80 has a lower speed than the second segment 84. Again, the two segments generated by the TAS system may not be as efficient in terms or fuel or time as a single speed subsegment. But the TAS system enables the instant aircraft 2 to avoid interventions by an ATC, which would cost the instant aircraft 2 even more fuel and time. Similar to the embodiment in FIG. 12, the TAW 82 in FIG. 13 may be selected between an upper limit 86 and a lower limit 88.

Figure 14:
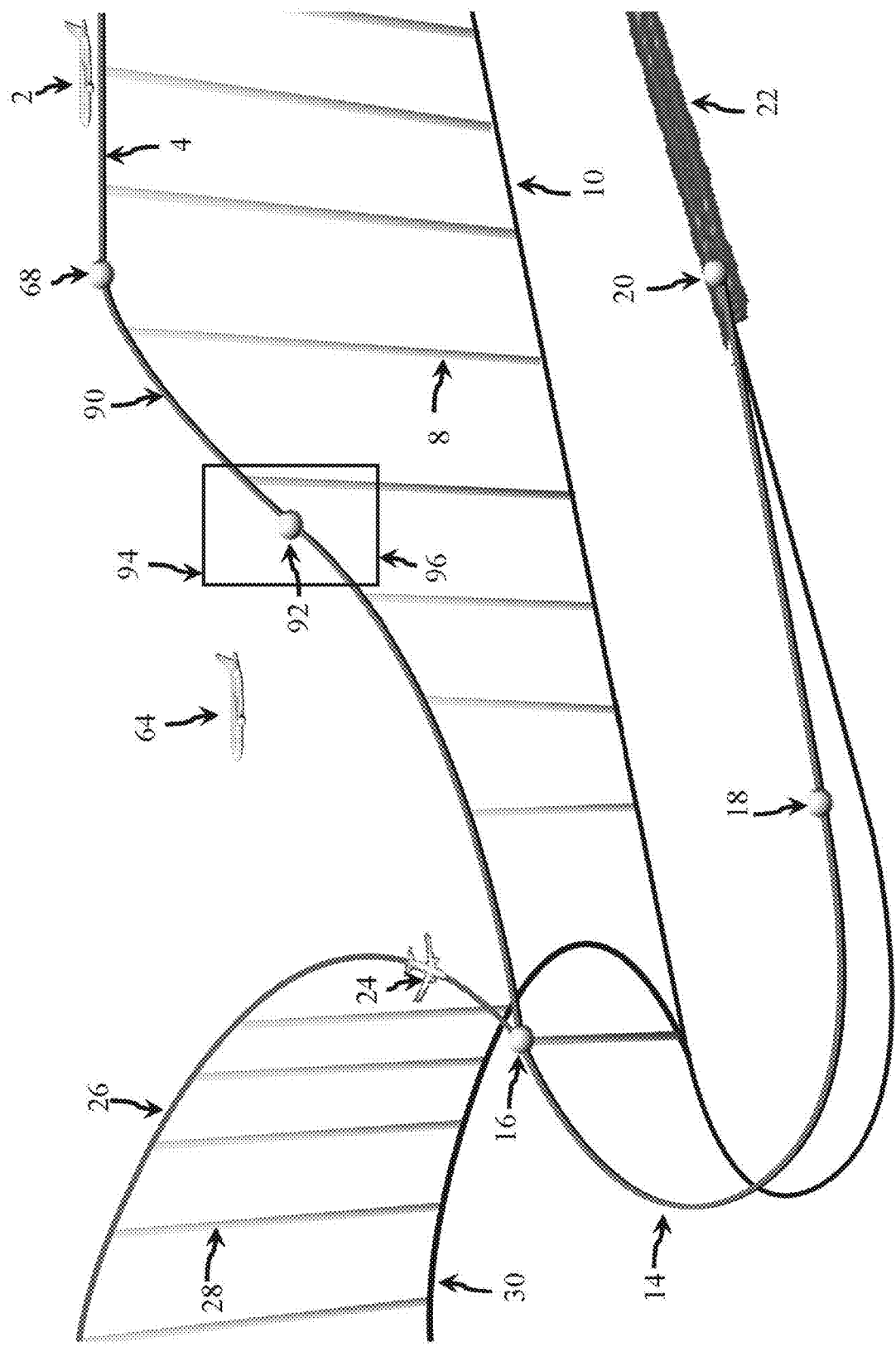
FIG. 14 illustrates an aircraft equipped with a TAS system entering a descent phase of a flight trajectory toward a merge point where a descent trajectory is selected from a plurality of conflict free descent trajectories to pass through a TAW, which allows the TAS equipped aircraft to fly a continuous descent using a brachistochronic speed profile passing through the TAW.

FIG. 14 depicts a TAS equipped aircraft 2 with a speed profile that follows a brachistochronic curve, which has a variable speed profile and results in a rapid descent phase 90 that saves energy and reduces the need for intervention by the ATC. In this embodiment, the pilot is presented with a plurality of TAWs 92 having an upper limit 94 and a lower limit 96. The selected TAW 92 is a point in space, and the pilot has chosen a brachistochronic speed profile that passes through the selected TAW 92 and avoids a conflict with a third aircraft 64. The flight trajectories illustrated in FIGS. 12 and 13 have multi-segmented profiles joined together at a TAW. However, flight trajectories may be generated that pass through the TAW and have a continuously variable speed profile. A brachistochronic curve is the path of shortest possible time for a aircraft to descend from a given point to another point that is not directly below the start where the only external force is gravity and the velocity at which the aircraft travels at is not constant.

The parametric expression of a brachistochronic speed profile can be characterized by:

$$x = r(\theta - \sin\theta); \quad y = r(1 - \cos\theta) \quad (22)$$

The TAS system enables descents with continuously changing velocity such as a brachistochronic or cycloidal trajectory descent between the TOD 68 to the merge point 16 through a selected TAW.

In further embodiments of the invention, additional types of waypoints may be utilized alone or in combination with TAWs. For example, an energy management waypoint (EMW) may be used to guide a flight trajectory and an aircraft through a waypoint that ensures avoidance of icing conditions, safe approaches and landings, avoidance of turbulence, etc.

Icing conditions may be defined as an icing event such as a supercooled cloud where the icing event defines a volume, and at least a portion of the volume has a temperature between approximately −5° C. and 2° C. Under these conditions, supercooled droplets of water or ice may impact the leading edge of a body on the aircraft then freeze or refreeze on cooler trailing edges of the body. Accretions of ice can alter the geometry of the aircraft, alter instrument readings, and add weight to the aircraft, all of which can jeopardize the safety of the aircraft. Additional information regarding the Federal Aviation Administration's characterization of icing events may be found in Advisory Circular No. 91-74A, entitled Pilot Guide: Flight in Icing Conditions and dated Dec. 31, 2007.

Turbulence comprises several features of airflow including irregularity, diffusivity, rotationality, and dissipation. Turbulent airflow can cause passenger discomfort when these feature of airflow become too erratic or chaotic. Airflow is conventionally divided into laminar flow and turbulent flow, and the Reynolds Number is frequently used to distinguish between these two types of flow. The equation for the Reynolds Number is defined as $$\frac{\rho v L}{\mu} \quad (23)$$

where $\rho$ is the density of the fluid (in this case air), v is the maximum velocity of an object (aircraft) relative to the fluid, L is the characteristic linear dimension of the object, and $\mu$ is the dynamic viscosity of the fluid. Essentially, the Reynolds Number is the ratio of inertial forces over viscous forces, and when the inertial forces are much larger than the viscous forces, then the fluid is turbulent. In most cases, a Reynolds Number greater than 5000 indicates a turbulent fluid.

In various embodiments, the EMW is generated to avoid the turbulent event or the icing event. However in other embodiments, an EMW may be generated to provide a range of acceptable airspeeds in a turbulent event or an icing event. Therefore, if it is unfeasible to completely avoid, for example, a turbulent event, then a range of airspeeds may be assigned to an EMW, or each EMW in a plurality of EMWs, to increase passenger comfort, safety, etc.

EMWs may be generated alone or in combination with TAWs. For example, after a plurality of TAWs is determined, then EMWs may be determined from the plurality of TAWs, and EMWs form a subset of the TAWs. As a result, the selected waypoint would be both a TAW and an EMW. Conversely, a plurality of EMWs may be determined that are wholly or partially different than the plurality of TAWs. In these embodiments, it may be possible for a selected TAW and a selected EMW to be distinct, and the flight trajectory passes through both selected waypoints.

FIGS. 9-14 focus on implementation of embodiments of the present invention to a vertical path of the aircraft. However, embodiments of the present invention may also be applied to a lateral path of the aircraft. Then accordingly, embodiments of the present invention may be applied to all three physical dimensions and a time dimension (4D).

Figure 15:
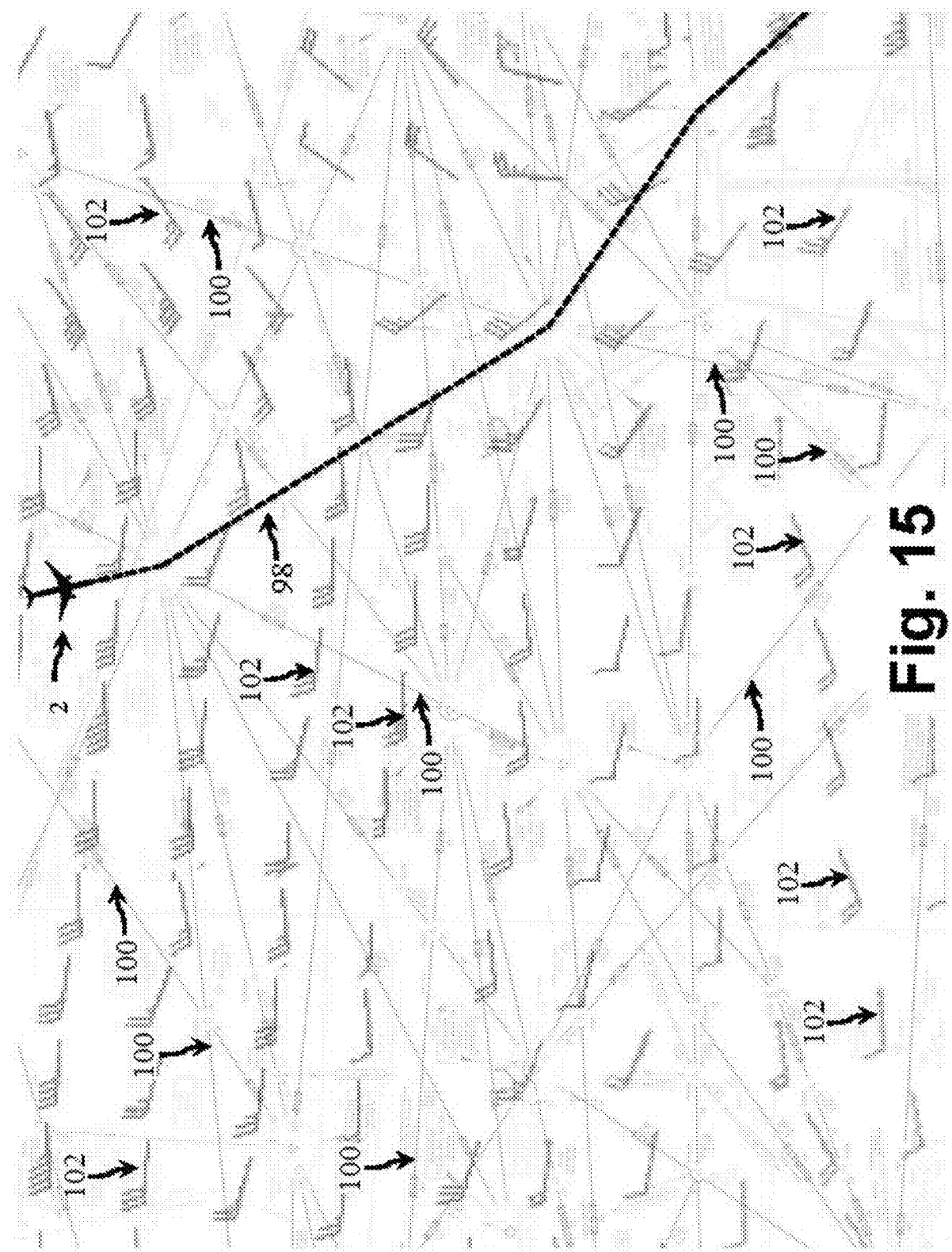
FIG. 15 is a top plan view of an aircraft equipped with a TAS system traveling along a selected flight trajectory among a plurality of airways where a series of wind fields are indentified.

FIG. 15 shows a top view of an aircraft traveling on a selected flight trajectory 98 among several available airways 100, or established corridors for aircraft to travel in. Wind information regarding the local wind field 102 is included in the TAS system's generation of a plurality of flight trajectories. As with other parameters, the TAS system may include the wind field information to optimize a flight trajectory for parameters such as fuel conservation or time efficiency.

Figure 16:
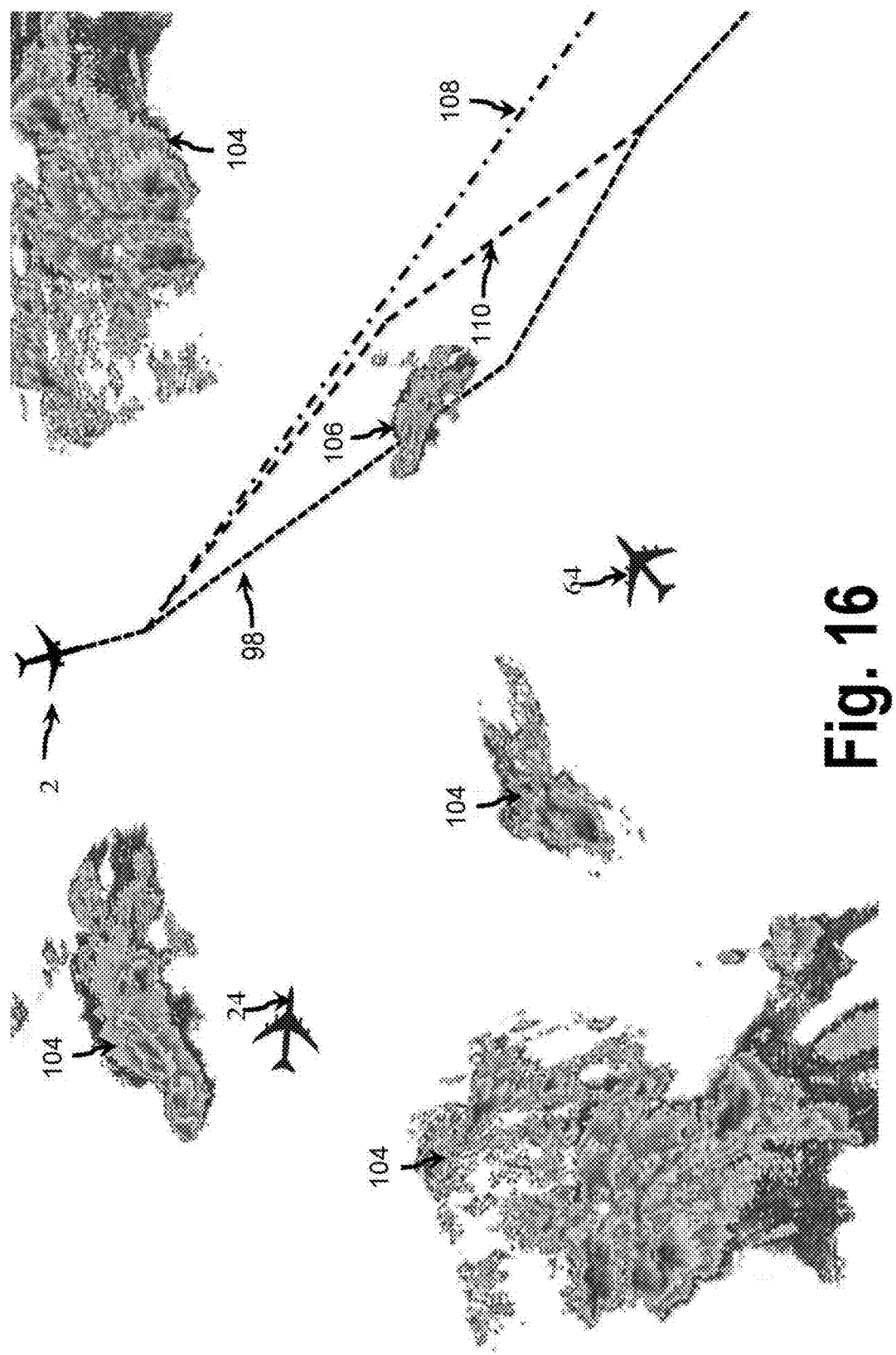
FIG. 16 is a top plan view of an aircraft equipped with a TAS system traveling along a selected flight trajectory toward a conflict weather event where the TAS system has generated an alternative flight trajectory that is optimized for fuel and another alternative flight trajectory that is optimized for time.

FIG. 16 illustrates a TAS equipped aircraft 2 traveling along a selected flight trajectory 98 with other aircraft 24, 64 traveling in the area. However, several weather events 104 are also located in the area, and a conflict weather event 106 is located on the selected flight trajectory 98. A weather event may include thunderstorms, microbursts, general turbulence, or any other atmospheric effect that may be undesirable due to safety, passenger comfort, time and fuel efficiency, etc. Thus, the TAS system may assign a SAI to a conflict weather event 106 like the TAS system assigns a SAI to another aircraft. The TAS system generates a plurality of flight trajectories that are conflict-free and do not bring the aircraft 2 too close to the conflict weather event 106. In this embodiment, the TAS system has generated two flight trajectories. A first flight trajectory 108 is optimized for the least time to an airport or a waypoint, and a second flight trajectory 110 is optimized for the least amount of fuel consumed to avoid the conflict weather event 106.

Both trajectories 108, 110 pass along the downwind side of the conflict weather event 106, and the SAI may require adjustment. Passing on the downwind side of a weather event may expose the aircraft, passengers, cargo and crew to turbulence and hail that can be ejected from the weather event. The TAS system allows for the dynamic adjustment of the SAI assigned to the conflict weather event 106 such that the aircraft 2 must pass by the downwind side of the conflict weather event 106 by a wider margin. Thus, the more fuel efficient or time efficient trajectory may be on the upwind side of the conflict weather event 106 to avoid the possibility of undue turbulence or being subject to hail.

Figure 17:
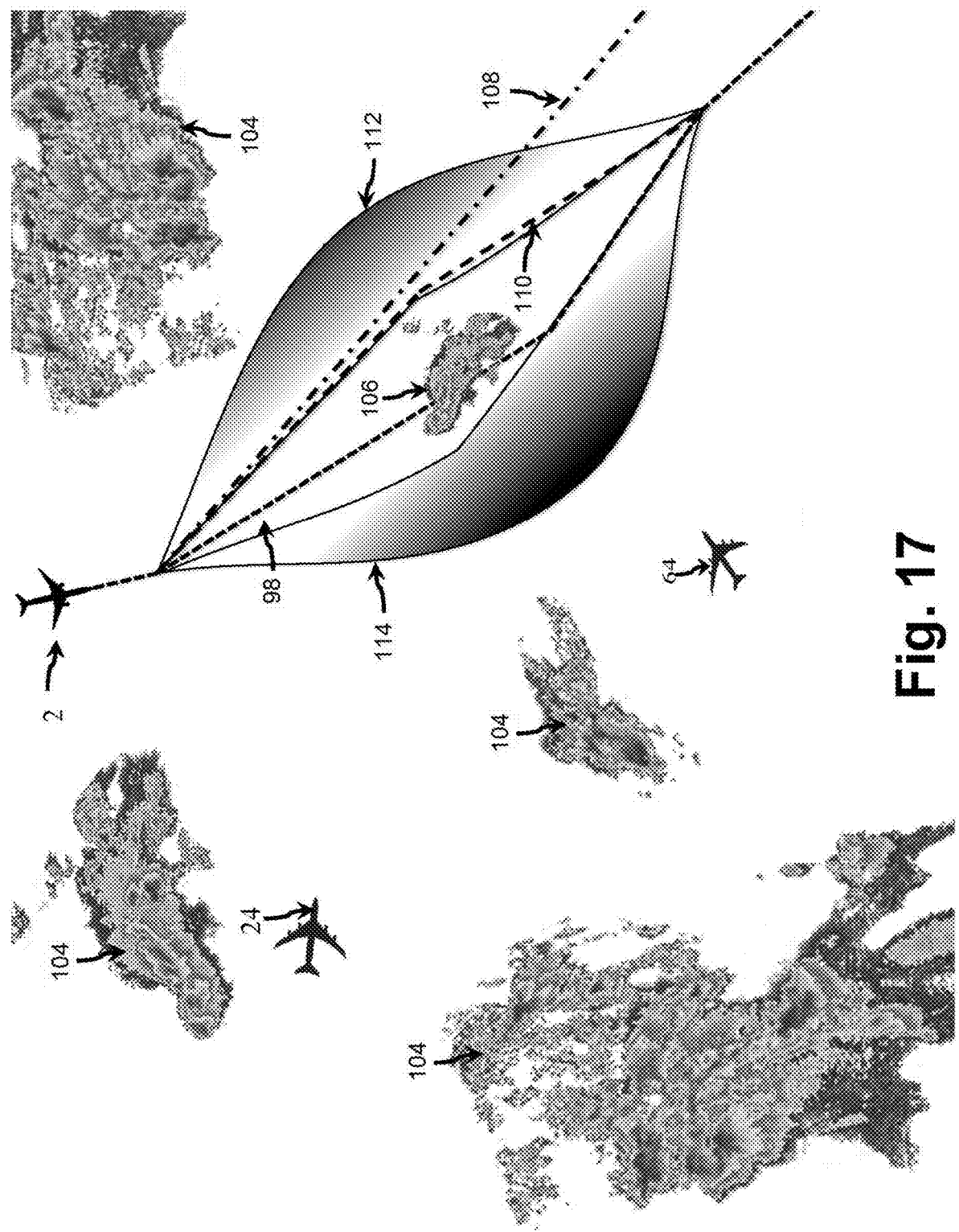
FIG. 17 is a top plan view of an aircraft equipped with a TAS system traveling along a selected flight trajectory toward a conflict weather event where the TAS system has generated two sets of flight trajectories that are a plurality of flight trajectories that range between flight trajectories that are optimized for fuel and time that use a maximum fuel allowance and/or a maximum time allowance.

FIG. 17 illustrates a TAS equipped aircraft 2 where the TAS system generates a plurality of flight trajectories based on a range of parameters. A first flight trajectory 108 and a second flight trajectory 110 represent flight trajectories that are optimized for time efficiency and fuel efficiency, respectively. The TAS system also accounts for maximum fuel burn allowable and maximum time allowable values for the fuel and time parameters. Using the time parameter as an example, after the first flight trajectory 108 is calculated, a second solution is generated where the second solution is not the optimal solution for time. In other words, the optimal solution is suppressed during the next flight trajectory generation or determination. This process is iteratively repeated until a flight trajectory is calculated with the maximum time allowed. As a result, a plurality of flight trajectories is generated that ranges in time value between the most time optimum flight trajectory and the flight trajectory that uses the most time allowed. When combined with the plurality of flight trajectories based on fuel, lateral boundaries 112, 114 are established that define the extent of the acceptable flight trajectories.

Also shown in FIG. 17 is the shading of the plurality of flight trajectories. Some flight trajectories in the plurality of flight trajectories may be time efficient but fuel inefficient. In contrast, some flight trajectories may be fuel efficient but time inefficient. Further yet, some flight trajectories may be both fuel and time efficient or both fuel and time inefficient. Without additional information, a pilot may not be able to discern these differences. Therefore, a ranking system may be provided in some embodiments of the invention.

Since the flight trajectories are iteratively calculated starting with the most optimized solution for a given parameter and ending with the least optimized solution, a number may be assigned to each solution. For example, "1" may be assigned to the most optimized solution, "2" to the second most optimized solution, etc. With multiple parameters, a given flight trajectory may have a "1" for fuel efficiency and a "5" for time efficiency. With equal weighting, this flight trajectory would have an average score of "3". To help visualize the results of this grading on a display unit, the highest scores (i.e., lowest numbers) could be assigned a color with a higher brightness value or luminosity and the lowest scores could be assigned the same color with a lower brightness value or luminosity. Then, a pilot may better select a flight trajectory among a plurality of flight trajectories.

Figure 18:
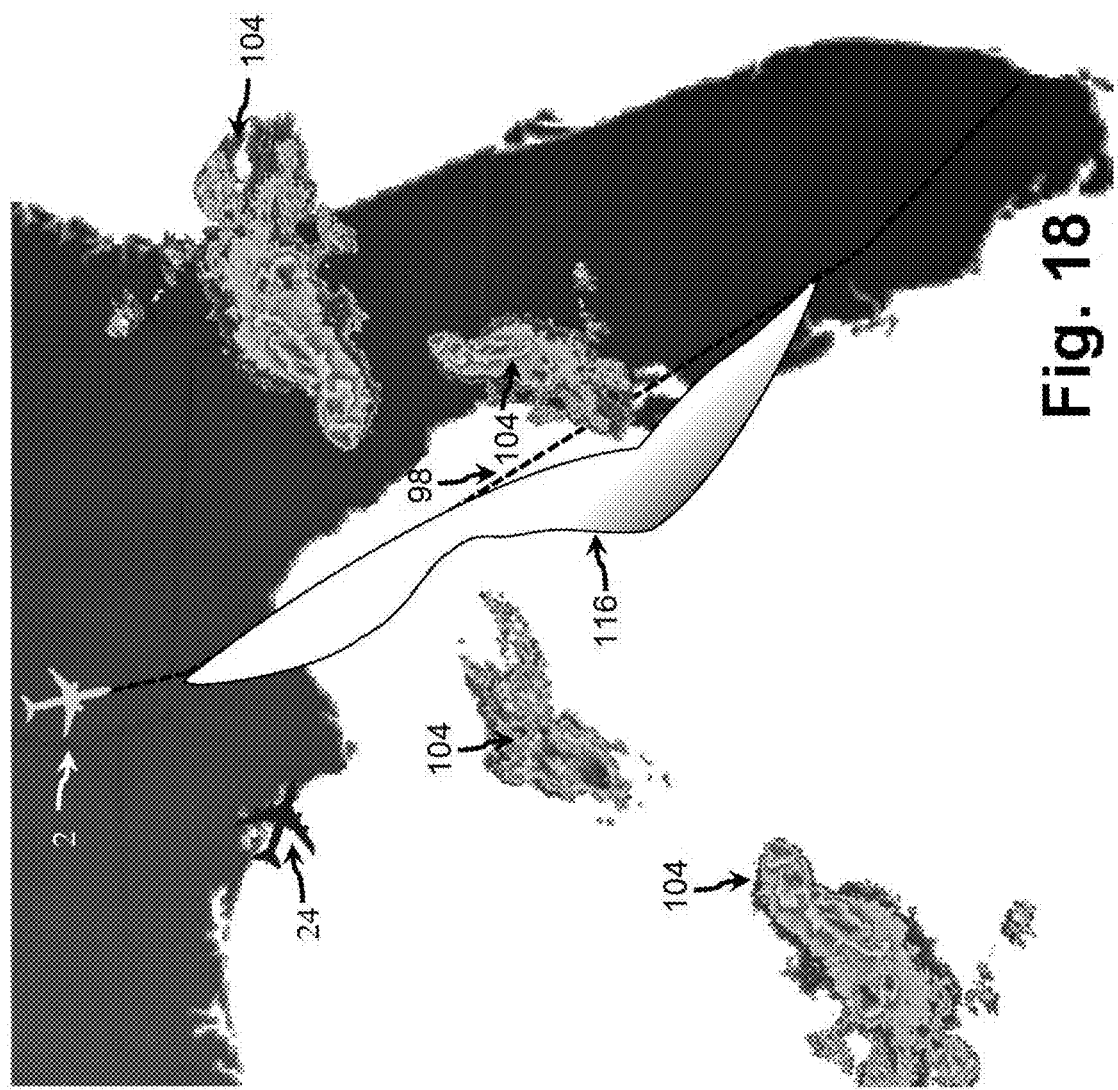
FIG. 18 is a top plan view of an aircraft equipped with a TAS system traveling along a selected flight trajectory where the TAS system has generated a plurality of flight trajectories that use a maximum fuel allowance and/or a maximum time allowance that account for multiple weather events and other operational constraints such as aircraft equipage to operate over water, flight crew qualifications, etc.

FIG. 18 depicts a TAS equipped aircraft 2 that has generated a plurality of flight trajectories 116 off of the Gulf Coast of Florida. This plurality of flight trajectories 116 presents trajectories that range through parameter values as described in reference to the embodiment of FIG. 17. The plurality of conflict-free flight trajectories 116 in FIG. 18 account for local weather events 104 and an Airline Operational Control (AOC) requirement that the aircraft cannot fly more than a set distance from shore.

Figure 19:
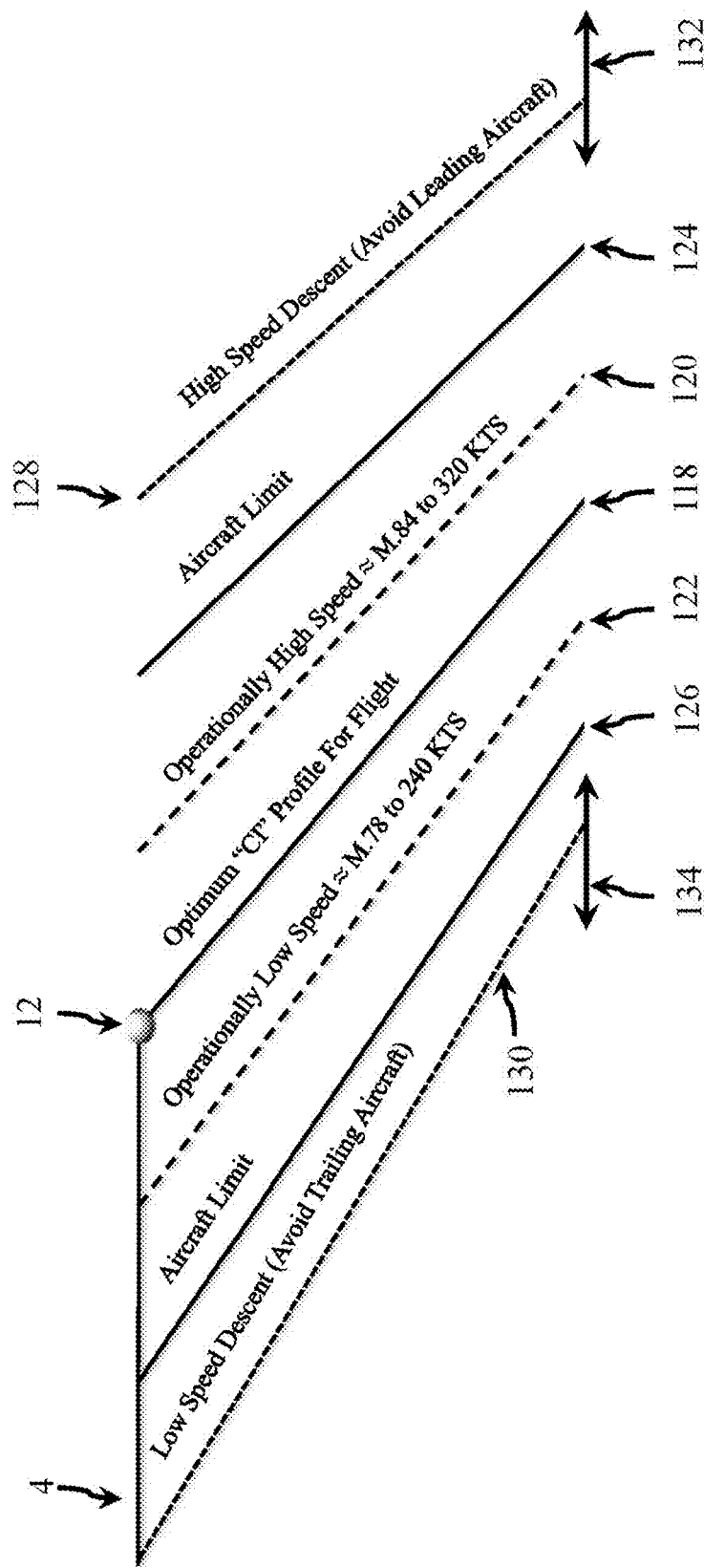
FIG. 19 illustrates various speed profiles for the descent phase of a flight trajectory.

FIG. 19 depicts the relationship between different speed profiles during the descent phase of a flight trajectory. When an aircraft is flown at slower speeds the aircraft's descent is shallower than when the aircraft flies at higher speeds, provided the throttle is at idle and the aircraft is in the same configuration. The optimum descent speed profile 118 predicated on the FMS idle thrust, descent speed schedule using the cost index associated with the filed flight plan and does not account for conflicting traffic, inclement weather, or changes in operational requirements to speed up or slow down to meet schedule. The operationally high speed profile 120 represents the fastest idle thrust, speed profile the aircraft should fly. The operationally low speed profile 122 represents the slowest idle thrust, speed profile the aircraft should fly. The aircraft limit lines 124 and 126 represent the speed profiles associated with the airframe limits. The fastest descent speed schedule 128 that avoids conflict with leading traffic or traffic that is ahead of the equipped aircraft may, at times, be greater that the operationally high speed limit 120 and the aircraft limit 124. The fastest descent speed to avoid conflicts with other proximate traffic may also be less than the speed schedule associated with the optimum speed schedule 118. This variation of the high speed descent speed profile is represented by the double headed arrow 132. The slowest descent speed schedule 58 that avoids conflict with training traffic or traffic that is behind of the equipped aircraft may, at times, be less than the operationally sound low speed limit 122 and the aircraft limit 126. The slowest descent speed 130 to avoid conflicts with other proximate traffic may also be greater than the speed schedule associated with the optimum speed schedule 118. This variation of the descent speed profile 130 is represented by the double headed arrow 134.

While the above description and drawings disclose and illustrate embodiments of the invention, it should be understood that the invention is not limited to these embodiments. It will be appreciated that the adjustment of en route 4 speeds can be adjusted by the instant aircraft equipped with TAS 34. It will be further appreciated that other modifications and changes employing the principles of the invention, particularly considering the foregoing teachings, may be made. Therefore, by the appended claims, the applicant intends to cover such modifications and other embodiments.

What is claimed is:

1. A method for heuristically determining a plurality of conflict-free flight trajectories for a first aircraft, comprising:
providing a traffic avoidance spacing system having at least one electronic device to process instructions for determining flight trajectories and providing a flight management system;
providing information regarding a first aircraft moving in an airspace according to a first state vector;
providing information regarding a second aircraft moving in said airspace according to a second state vector, said second aircraft having a standard avoidance interval extending in at least one direction from said second aircraft;
determining, by said at least one electronic device, a plurality of flight trajectories for said first aircraft based on said first state vector of said first aircraft;
comparing, by said at least one electronic device, flight trajectories of said plurality of flight trajectories to said second state vector of said second aircraft to determine a miss distance between said first aircraft and said second aircraft for each flight trajectory of said plurality of flight trajectories;
providing information regarding at least one constraint from a supplemental dataset;
determining, by said at least one electronic device, a plurality of conflict-free flight trajectories which are flight trajectories of said plurality of flight trajectories that have a miss distance greater than said standard avoidance interval and that comply with said at least one constraint; and
receiving and executing, by said flight management system for said first aircraft, a flight trajectory of said plurality of conflict-free flight trajectories.

2. The method of claim 1, wherein said at least one constraint is a runway conflict, and flight trajectories of said plurality of flight trajectories comply with said runway conflict when said flight trajectories avoid a runway with said runway conflict.

3. The method of claim 1, wherein said at least one constraint is a weather hazard, and flight trajectories of said plurality of flight trajectories comply with said weather hazard when said flight trajectories avoid a spatial volume with said weather hazard.

4. The method of claim 1, wherein said at least one constraint is a no-fly zone, and flight trajectories of said plurality of flight trajectories comply with said no-fly zone when said flight trajectories avoid a spatial volume that defines said no-fly zone.

5. The method of claim 1, further comprising:
transmitting said supplemental dataset across a network to said traffic avoidance spacing system.

6. A heuristic system for determining a plurality of conflict-free flight trajectories for a first aircraft, comprising:
at least one data device providing information regarding a first aircraft moving in an airspace according to a first state vector, a second aircraft moving in said airspace according to a second state vector, and at least one constraint from a supplemental dataset;
a trajectory generation device receiving said first state vector, said second state vector, and said supplemental dataset from said at least one data device, wherein said trajectory generation device:
assigns a standard avoidance interval to said second aircraft, said standard avoidance interval extending in at least one direction from said second aircraft;
determines a plurality of flight trajectories for said first aircraft based on said first state vector of said first aircraft;
compares flight trajectories of said plurality of flight trajectories to said second state vector of said second aircraft to determine a miss distance between said first aircraft and said second aircraft for each flight trajectory of said plurality of flight trajectories;
determines a plurality of conflict-free flight trajectories which are flight trajectories of said plurality of flight trajectories that have a miss distance greater than said standard avoidance interval and that comply with said at least one constraint; and
a flight management system receives and executes a flight trajectory of said plurality of conflict-free flight trajectories for said first aircraft.

7. The heuristic system of claim 6, wherein said at least one data device comprises a traffic device that provides information regarding said first aircraft moving in said airspace according to said first state vector.

8. The heuristic system of claim 6, wherein said at least one data device comprises a transmitted data device that provides information regarding said second aircraft moving in said airspace according to said second state vector.

9. The heuristic system of claim 6, wherein said at least one data device comprises a data device that is connected to a network, wherein said data device provides information regarding said at least one constraint from said supplemental dataset.

10. The heuristic system of claim 9, wherein said at least one constraint is transmitted from said supplemental data set, across said network, and to said data device.

11. A system for reducing interventions from an air traffic controller in an airspace, comprising:
an air traffic controller providing a first number of interventions to a plurality of aircraft in an airspace over a first time period;
a first aircraft of said plurality of aircraft moving in said airspace according to a first state vector;
a second aircraft of said plurality of aircraft moving in said airspace according to a second state vector, said second aircraft having a standard avoidance interval extending in at least one direction from said second aircraft;
a traffic avoidance spacing system having at least one electronic device to process instructions for determining flight trajectories, wherein said traffic avoidance system:
determines a plurality of flight trajectories for said first aircraft based on said first state vector of said first aircraft;
compares flight trajectories of said plurality of flight trajectories to said second state vector of said second aircraft to determine a miss distance between said first aircraft and said second aircraft for each flight trajectory in said plurality of flight trajectories;

determines a plurality of conflict-free flight trajectories which are flight trajectories of said plurality of flight trajectories that have a miss distance greater than said standard avoidance interval and that comply with an additional constraint from a supplemental dataset; and a flight management system of said first aircraft, wherein said flight management system receives and executes a flight trajectory of said plurality of conflict-free flight trajectories such that said air traffic controller provides a second number of interventions to said plurality of aircraft in said airspace over a second time period, and wherein said second number is less than said first number, and said second time period is distinct from said first time period.

12. The system of claim 11, wherein said first number of interventions includes a first number of off-path vectors, and said second number of interventions includes a second number of off-path vectors, wherein said second number of off-path vectors is less than said first number of off-path vectors.

13. The system of claim 11, wherein said airspace is an air traffic control sector.

14. The system of claim 11, wherein said additional constraint is at least one of a runway conflict, a wind hazard, a thunderstorm hazard, a turbulence hazard, a no-fly zone, and air traffic control sector loading above a predetermined value.

15. The system of claim 11, wherein said first time period includes a first net fuel burn for said plurality of aircraft, and said second time period includes a second net fuel burn for said plurality of aircraft, wherein said second net fuel burn is less than said first net fuel burn.

16. A method for determining a plurality of self-spacing flight trajectories for an aircraft in an urban air mobility environment, comprising:

providing a traffic avoidance spacing system having at least one electronic device to process instructions for determining flight trajectories and providing a flight management system;

providing information regarding a first aircraft moving in an airspace according to a first state vector, a second aircraft moving in said airspace according to a second state vector, and a third aircraft moving in said airspace according to a third state vector, wherein said first aircraft has a first standard avoidance interval extending in at least one direction from said first aircraft, and said second aircraft has a second standard avoidance interval extending in at least one direction from said second aircraft;

determining, by said at least one electronic device, a plurality of flight trajectories for said third aircraft based on said third state vector of said third aircraft;

comparing, by said at least one electronic device, flight trajectories of said plurality of flight trajectories to said first state vector of said first aircraft to determine a first miss distance between said first aircraft and said third aircraft for each flight trajectory of said plurality of flight trajectories;

comparing, by said at least one electronic device, flight trajectories of said plurality of flight trajectories to said second state vector of said second aircraft to determine a second miss distance between said second aircraft and said third aircraft for each flight trajectory of said plurality of flight trajectories;

determining, by said at least one electronic device, a plurality of self-spacing flight trajectories which are flight trajectories of said plurality of flight trajectories that have a first miss distance greater than said first standard avoidance interval and have a second miss distance greater than said second standard avoidance interval; and receiving and executing, by said flight management system for said third aircraft, a flight trajectory of said plurality of self-spacing flight trajectories to establish a self- spacing of said third aircraft between said first and second aircrafts.

17. The method of claim 16, wherein said first aircraft has an intersection point located in a trailing direction behind said first aircraft by a predetermined distance, wherein said executed flight trajectory passes through said intersection point.

18. The method of claim 16, wherein said first standard avoidance interval defines an enclosed volume surrounding said first aircraft, and said enclosed volume of said first standard avoidance interval comprises a cylindrical shape, wherein top and bottom surfaces of said enclosed volume defined by a vertical separation distance, and a circumferential surface of said enclosed volume defined by a radial distance.

19. The method of claim 18, wherein said vertical separation distance and said radial distance are dependent on at least one of the speed, performance, size, configuration and type of aircraft, proximity to an ATC boundary or airport, and point in said executed flight trajectory.

20. The method of claim 16, wherein said flight trajectory is executed, by said flight management system for said third aircraft, prior to a top-of-decent point of said flight trajectory.

* * * * *